US012470873B2

(12) United States Patent
Zhang et al.

(10) Patent No.: US 12,470,873 B2
(45) Date of Patent: Nov. 11, 2025

(54) LOUDSPEAKER

(71) Applicant: MERRY ELECTRONICS (SUZHOU) CO., LTD., Suzhou (CN)

(72) Inventors: Yuanyuan Zhang, Suzhou (CN); Mingya Luo, Suzhou (CN)

(73) Assignee: MERRY ELECTRONICS (SUZHOU) CO., LTD., Suzhou (CN)

( * ) Notice: Subject to any disclaimer, the term of this patent is extended or adjusted under 35 U.S.C. 154(b) by 173 days.

(21) Appl. No.: 18/397,654

(22) Filed: Dec. 27, 2023

(65) Prior Publication Data

US 2024/0348979 A1 Oct. 17, 2024

(30) Foreign Application Priority Data

Apr. 14, 2023 (CN) ......................... 202310397326.1

(51) Int. Cl.
*H04R 9/02* (2006.01)
*H04R 9/06* (2006.01)

(52) U.S. Cl.
CPC ............... *H04R 9/025* (2013.01); *H04R 9/06* (2013.01)

(58) Field of Classification Search
CPC ...... H04R 9/025; H04R 9/06; H04R 2400/11; H04R 9/043; H04R 9/02
See application file for complete search history.

(56) References Cited

U.S. PATENT DOCUMENTS

2022/0417664 A1* 12/2022 Hsu ...................... H05K 1/0277

* cited by examiner

*Primary Examiner* — Tuan D Nguyen
(74) *Attorney, Agent, or Firm* — Birch, Stewart, Kolasch & Birch, LLP

(57) ABSTRACT

Provided is a loudspeaker. The loudspeaker includes a shell, a vibration structure, a magnetic circuit structure, a voice coil and a bridging structure. The vibration structure is disposed on the shell. The magnetic circuit structure includes a yoke and a magnetic pole structure disposed on the yoke. The voice coil is connected to the vibration structure and is movable relative to the magnetic circuit structure. The yoke is connected to the shell through the bridging structure, and when the loudspeaker is in sound generating operation, the magnetic circuit structure is configured to vibrate independently relative to the shell under a separation of the bridging structure.

20 Claims, 12 Drawing Sheets

LOUDSPEAKER

CROSS-REFERENCE TO RELATED APPLICATIONS

This application claims priority to Chinese Patent Application No. 2023103973261 filed Apr. 14, 2023, the disclosure of which is incorporated herein by reference in its entirety.

TECHNICAL FIELD

The present disclosure relates to the technical field of loudspeakers, and in particular to, a loudspeaker.

BACKGROUND

An inside space of a vibration structure on the loudspeaker serves as a rear cavity, and a voice coil, a magnetic pole piece, a magnet and a yoke are disposed in the rear cavity. The voice coil is connected to the vibration structure. The magnetic pole piece, the magnet and the yoke constitute a magnetic circuit structure, and the magnetic circuit structure is connected to a shell supporting the vibration structure. When the alternating current is communicated, the voice coil drives the vibration structure to vibrate and sound under the action of the ampere force. At this time, the magnetic circuit structure constituted by the magnetic pole piece, the magnet and the yoke is subjected to a reverse acting force, the reverse acting force and the ampere force to which the voice coil is subjected are equal in magnitude and opposite in direction. The reverse acting force is finally conducted to the shell of the loudspeaker, thereby causing the excessive vibration of the shell, causing the damage to the sound quality, and affecting the use feeling of the consumers.

SUMMARY

The present disclosure provides a loudspeaker, which can reduce the impact force of a magnetic circuit structure on a shell during the sound generating operation.

For this purpose, the present disclosure adopts the following technical schemes.

A loudspeaker is provided. The loudspeaker includes a shell, a vibration structure, a magnetic circuit structure, a voice coil and a bridging structure. The vibration structure is disposed on the shell. The magnetic circuit structure includes a yoke and a magnetic pole structure disposed on the yoke. The voice coil is connected to the vibration structure and is movable relative to the magnetic circuit structure. The yoke is connected to the shell through the bridging structure, and when the loudspeaker is in sound generating operation, the magnetic circuit structure is configured to vibrate independently relative to the shell under a separation of the bridging structure.

In an embodiment, the voice coil includes a main voice coil and at least one auxiliary voice coil. The main voice coil is connected to the vibration structure, and the at least one auxiliary voice coil is connected to the shell. When the main voice coil and the at least one auxiliary voice coil are energized for operation, a direction of an acting force applied to the magnetic circuit structure by the main voice coil is opposite to a direction of an acting force applied to the magnetic circuit structure by the at least one auxiliary voice coil.

In an embodiment, the magnetic pole structure includes a main magnetic pole structure and an auxiliary magnetic pole structure. The main magnetic pole structure is disposed on the yoke, and the main voice coil is disposed around a periphery of the main magnetic pole structure. The auxiliary magnetic pole structures are disposed on the yoke and are located outside the main voice coil, and each of the at least one auxiliary voice coil is correspondingly configured with one auxiliary magnetic pole structure.

In an embodiment, two auxiliary voice coils are provided, the two auxiliary voice coils are disposed at an interval, and the main voice coil is located between the two auxiliary voice coils.

In an embodiment, each of the auxiliary magnetic pole structures includes a first auxiliary magnetic assembly and a second auxiliary magnetic assembly. The first auxiliary magnetic assembly is disposed on the yoke and is located at the periphery of the main magnetic pole structure, the first auxiliary magnetic assembly and the main magnetic pole structure are configured to be magnetized in a vibration direction of the vibration structure, and a magnetic pole direction of the first auxiliary magnetic assembly is opposite to a magnetic pole direction of the main magnetic pole structure. The second auxiliary magnetic assembly is disposed on the yoke and is located on a side of the first auxiliary magnetic assembly facing away from the main magnetic pole structure, and a magnetic pole direction of the second auxiliary magnetic assembly is parallel to the magnetic pole direction of the main magnetic pole structure.

In an embodiment, each of the auxiliary magnetic pole structures includes a first auxiliary magnetic assembly and a second auxiliary magnetic assembly. The first auxiliary magnetic assembly is disposed on the yoke and is located at the periphery of the main magnetic pole structure, the first auxiliary magnetic assembly and the main magnetic pole structure are configured to be magnetized in a vibration direction of the vibration structure, and a magnetic pole direction of the first auxiliary magnetic assembly is opposite to a magnetic pole direction of the main magnetic pole structure. The second auxiliary magnetic assembly is disposed on the yoke and is located on a side of the first auxiliary magnetic assembly facing away from the main magnetic pole structure, and a magnetic pole direction of the second auxiliary magnetic assembly is perpendicular to the magnetic pole direction of the main magnetic pole structure.

In an embodiment, the bridging structure includes cantilevers, two ends of the yoke are provided with the cantilevers, respectively, and the yoke is erected in the shell in a suspended manner and is connected to the shell through the cantilevers.

In an embodiment, the loudspeaker further includes an outer cover connected to the shell. The cantilevers are connected to the shell through the outer cover, and the yoke, the cantilevers and the outer cover are integrally formed by hollowing and processing a plate sheet structure.

In an embodiment, the bridging structure includes a first elastic pad sandwiched between the shell and the yoke.

In an embodiment, the bridging structure further includes multiple inner support bodies. The multiple inner support bodies are connected to the shell through the first elastic pad, and the yoke is sandwiched between the multiple inner support bodies.

REFERENCE LIST

Figure 1:
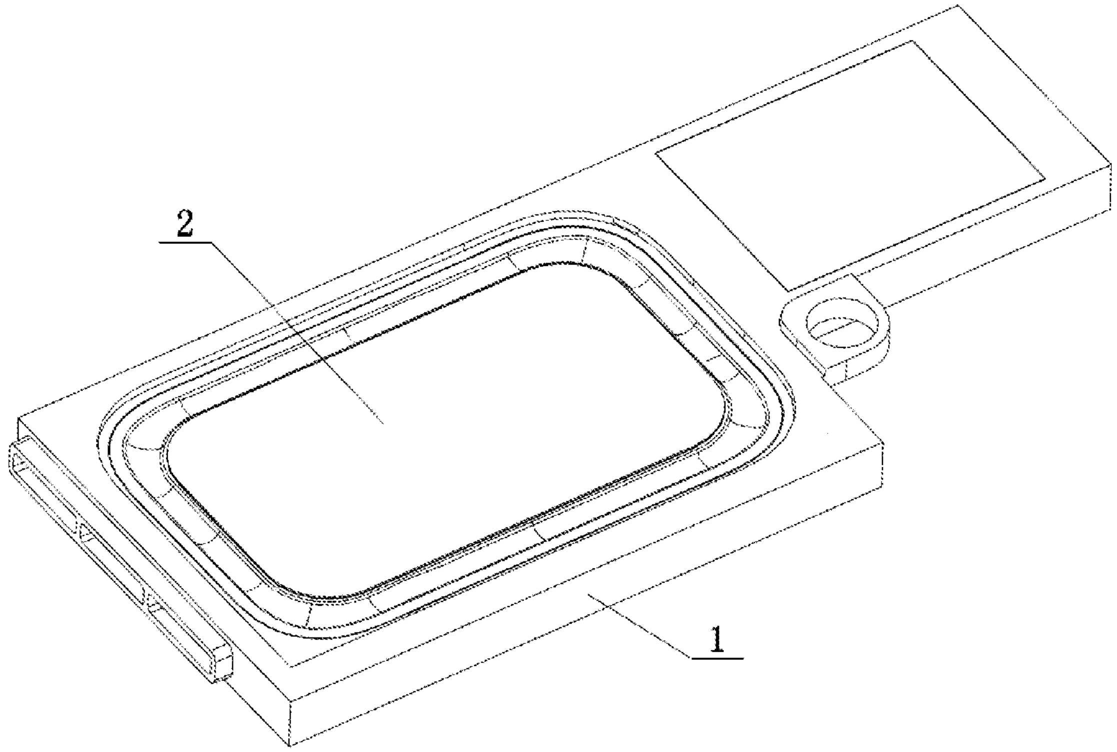
FIG. 1 is a structure view of a loudspeaker according to an embodiment one.
Figure 2:
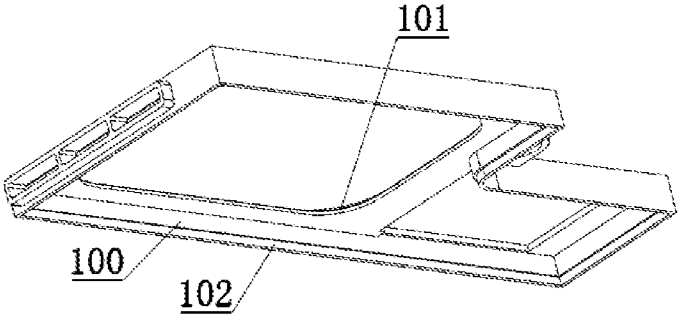
FIG. 2 is a structure view of a shell according to the embodiment one.
Figure 3:
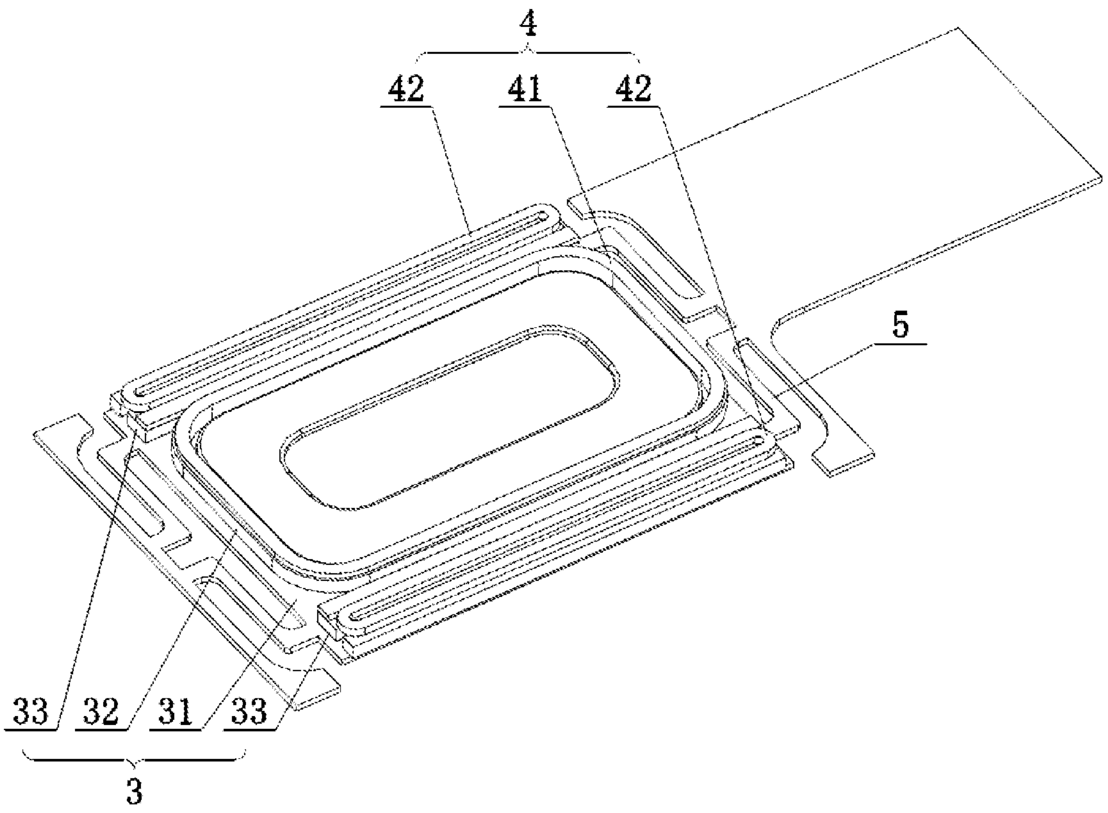
FIG. 3 is a structure view of a loudspeaker according to the embodiment one, with a shell and a vibration structure omitted.

1 shell
100 accommodation cavity
101 sound generating port
102 carrying port
11 first support arm
2 vibration structure
3 magnetic circuit structure
31 yoke
311 bottom plate portion
312 support plate portion
32 main magnetic pole structure
321 main magnet
322 main magnetic pole piece
33 auxiliary magnetic pole structure
331 auxiliary magnet
3311 first auxiliary magnet
3312 second auxiliary magnet
332 auxiliary magnetic pole piece
3321 first auxiliary magnetic pole piece
3322 second auxiliary magnetic pole piece
4 voice coil
41 main voice coil
41*a* first main voice portion
42 auxiliary voice coil
42*a* first auxiliary voice portion
42*b* second auxiliary voice portion
5 bridging structure
51 cantilever
511 first connection segment
512 second connection segment
513 third connection segment
52 first elastic pad
521 boss
522 notch
523 extension convex hull
524 projection
525 groove
53 inner support body
531 support rod portion
5311 first connection portion
5311*a* planar portion
5311*b* ramp portion
5311*c* first step groove
5312 second connection portion
5312*a* second step groove
532 first limiting portion
533 first receiving cavity
534 second limiting portion
535 second receiving cavity
54 second elastic pad
6 outer cover
61 air vent
7 magnetic induction coil

DETAILED DESCRIPTION

Embodiments of the present disclosure will be described in detail below, examples of the described embodiments are shown in the accompanying drawings, where same or similar reference numerals refer to same or similar parts or parts having same or similar functions throughout. The embodiments described below with reference to the accompanying drawings are exemplary, are intended to explain the present disclosure, and are not be construed as limiting the present disclosure.

In the description of the present disclosure, unless otherwise expressly specified and limited, the term "connected to each other", "connected", or "fixed" is to be construed in a broad sense, for example, as securely connected, or detachably connected; mechanically connected or electrically connected; directly connected to each other, indirectly connected to each other via an intermediary, internal connection between two elements, or interaction between two elements. For those of ordinary skill in the art, specific meanings of the preceding terms in the present disclosure may be understood based on specific situations.

In the description of the present disclosure, unless otherwise expressly specified and limited, a first feature being “on” or “under” a second feature may include the first feature and the second feature being in direct contact, or may include the first feature and the second feature not being in direct contact but being in contact with each other through an additional feature therebetween. Moreover, the first feature being “on”, “above” or “over” the second feature includes the first feature being directly on, above or over and obliquely on, above or over the second feature, or simply indicates that the first feature is at a higher level than the second feature. The first feature being “under”, “below” or “underneath” the second feature includes the first feature being directly under, below or underneath and obliquely under, below or underneath the second feature, or simply represents that the first feature is at a lower level than the second feature.

The technical solutions of the present disclosure are further described hereinafter in conjunction with drawings and the specific implementation mode.

Embodiment One

As shown in FIGS. 1 to 7, this embodiment provides a loudspeaker. The loudspeaker includes a shell 1, a vibration structure 2, a magnetic circuit structure 3, a voice coil 4 and a bridging structure 5. The vibration structure 2 is disposed on the shell 1. The magnetic circuit structure 3 includes a yoke 31 and a magnetic pole structure disposed on the yoke 31. The voice coil 4 is connected to the vibration structure 2 and is movable relative to the magnetic circuit structure 3. The yoke 31 is connected to the shell 1 through the bridging structure 5. When the loudspeaker is in sound generating operation, the magnetic circuit structure 3 is connected to the shell 1 only through the bridging structure 5. Therefore, when the magnetic circuit structure 3 resonates due to an ampere force, the vibration can be conducted to the shell 1 only through the bridging structure 5, so that the magnetic circuit structure 3 can independently vibrate relative to the shell 1 under the separation of the bridging structure 5.

In the present disclosure, the bridging structure 5 is provided to separate the shell 1 from the magnetic circuit structure 3, so that the contact area between the magnetic circuit structure 3 and the shell 1 is reduced, and further the vibration of the magnetic circuit structure 3 transmitted to the shell 1 is reduced, thereby effectively reducing the impact force of the magnetic circuit structure 3 on the shell 1 when the loudspeaker is in sound generating operation, and ensuring the sound quality of the loudspeaker by means of reducing the excessive vibration of the shell 1.

In this embodiment, an accommodation cavity 100 is disposed on the shell 1, one end of the accommodation cavity 100 in a first direction is communicated to the outside through a sound generating port 101, another end of the accommodation cavity 100 is connected to the outside through a carrying port 102, and the voice coil 4 is movable relative to the magnetic circuit structure 3 in the first direction.

Specifically, the voice coil 4 includes a main voice coil 41 and at least one auxiliary voice coil 42. The main voice coil 41 is connected to the vibration structure 2, and the main voice coil 41 moves along with the movement of the vibration structure 2 so that the main voice coil 41 can move relative to the magnetic circuit structure 3 in the first direction. An alternating current is applied to the main voice coil 41 when being energized for operation, so that the main voice coil 41 applies an ampere force to the magnetic circuit structure 3, and the magnetic circuit structure 3 generates a resonance accordingly. The auxiliary voice coil 42 is connected to the shell 1, and an alternating current opposite to a direction of a current in the main voice coil 41 is applied to the auxiliary voice coil 42 when being energized for operation, so that the auxiliary voice coil 42 exerts, to the magnetic circuit structure 3, an ampere force opposite to the ampere force applied by the main voice coil 41, thereby suppressing the resonance generated by the magnetic circuit structure 3. The direction of the acting force applied by the main voice coil 41 to the magnetic circuit structure 3 when the main voice coil 41 is energized for operation is opposite to the direction of the acting force applied by the auxiliary voice coil 42 to the magnetic circuit structure 3 when the auxiliary voice coil 42 is energized for operation, so that the impact force of the magnetic circuit structure 3 on the shell 1 can be further reduced.

More specifically, two or more auxiliary voice coils 42 may be provided, and a number of the two or more auxiliary voice coils 42 may be an even number. The two or more auxiliary voice coils 42 are all connected to the shell 1, and are oppositely disposed on the outer side the main voice coil 41. That is, two auxiliary voice coils 42 are correspondingly disposed on two ends of the main voice coil 41 with the main voice coil 41 as a center, the two auxiliary voice coils 42 are used as a first auxiliary voice coil group, then another two auxiliary voice coils 42 are disposed on a side of the first auxiliary voice coil group not adjacent to the main voice coil 41, the another two auxiliary voice coils 42 are used as a second auxiliary voice coil group, and so on, and at least one auxiliary voice coil group may be extended outwards from the two ends of the main voice coil 41.

When two or more auxiliary voice coils 42 are provided, the auxiliary voice coils 42 may be oppositely disposed on the outer side the main voice coil 41 so that the auxiliary voice coils 42 uniformly apply a reverse ampere force to the magnetic circuit structure 3 as a whole, thereby uniformly suppressing the resonance of the magnetic circuit structure 3, and avoiding influence of deflection and skew of the magnetic circuit structure 3 on the sound quality of the loudspeaker.

As a damping structure, the auxiliary voice coils 42 are independently disposed on the outer side the main voice coil 41, and are connected to the shell 1. When an alternating current is supplied to the auxiliary voice coils 42 to generate a reverse ampere force, the auxiliary voice coils 42 are independent of the movement of the main voice coil 41 and the vibration structure 2, and the reverse ampere force is directly conducted to the shell 1, so that the influence on the sound quality of the loudspeaker is avoided, and the vibration of the shell 1 can be directly suppressed.

The magnetic circuit structure 3 will be described in detail below.

Specifically, the magnetic circuit structure 3 includes a yoke 31 and a magnetic pole structure. The magnetic pole structure includes a main magnetic pole structure 32 and an auxiliary magnetic pole structure 33. The yoke 31 is connected to the shell 1, the main magnetic pole structure 32 is disposed on the yoke 31, the main voice coil 41 is disposed around a periphery of the main magnetic pole structure 32, and an interacting force is generated between the main voice coil 41 and the main magnetic pole structure 32 when the main voice coil 41 is energized for operation. Auxiliary magnetic pole structures 33 are disposed on the yoke 31, are oppositely disposed on two ends of the main magnetic pole structure 32 with the main magnetic pole structure 32 as the center, and are located outside the main voice coil 41.

In a case where at least two auxiliary voice coils 42 are provided, position at which the auxiliary voice coils 42 are disposed may correspond to positions at which the auxiliary magnetic pole structures 33 are disposed.

The auxiliary magnetic pole structure 33 is provided so that magnetic induction lines passing through the auxiliary voice coil 42 can be increased, and the auxiliary voice coil 42 can generate a larger reverse amperage force when an alternating current is supplied, thereby improving the vibration reduction effect and making the sound production of the loudspeaker more stable.

More specifically, for the structure of the yoke 31, the loudspeaker further includes a sheet-like outer cover 6, and the outer cover 6 is adhesively connected to the shell 1. The yoke 31, the cantilever 51 and the outer cover 6 are integrally formed by hollowing and processing a plate sheet structure, that is, the yoke 31 and the cantilever 51 are integrally formed on the outer cover 6, and the yoke 31 is connected to the outer cover 6 only through the cantilevers 51 at two ends in the third direction so that the magnetic circuit structure 3 is erected in the shell 1 in a suspended manner.

Specifically, the main magnetic pole structure 32 includes a main magnet 321 and a main magnetic pole piece 322. The main magnet 321 is disposed on a side of the yoke 31 facing the vibration structure 2, the main magnetic pole piece 322 is disposed on the main magnet 321, and the main voice coil 41 is disposed around a periphery of the main magnet 321 and the main magnetic pole piece 322.

More specifically; the auxiliary magnetic pole structure 33 includes a first auxiliary magnetic assembly, and the first auxiliary magnetic assembly includes a first auxiliary magnet 3311 and a first auxiliary magnetic pole piece 3321. The first auxiliary magnet 3311 is disposed on the side of the yoke 31 facing the vibration structure 2, the first auxiliary magnetic pole piece 3321 is disposed on a side of the first auxiliary magnet 3311 facing the main magnetic pole structure 32, and an area of the first auxiliary magnetic pole piece 3321 is less than or equal to an upper surface area of the first auxiliary magnet 3311. In the case where the area of the first auxiliary magnetic pole piece 3321 is less than the upper surface area of the first auxiliary magnet 3311, when moving, the auxiliary voice coil 42 can move downward into a gap formed by the first auxiliary magnetic pole piece 3321 and the upper surface of the first auxiliary magnet 3311, and the gap may be used to prolong the movement path of the auxiliary voice coil 42.

A main magnetic gap is formed between the first auxiliary magnetic assembly and the main magnetic pole structure 32, and the main voice coil 41 is disposed within the main magnetic gap in a suspended manner and passes through the main magnetic gap when moving. In a case where one auxiliary voice coil 42 is provided, a position of a set of opposite sides of the auxiliary voice coil 42 may correspond to the position of the first auxiliary magnetic assembly, and the auxiliary voice coil 42 may be disposed around the outside of the first auxiliary magnetic assembly. In a case where at least two auxiliary voice coils 42 are provided, a position of the auxiliary voice coils 42 may correspond to the position of the first auxiliary magnetic assembly, and the auxiliary voice coils 42 may be distributed outside the first auxiliary magnetic assembly.

In this embodiment, a magnetic pole direction of the first auxiliary magnetic assembly composed of the first auxiliary magnet 3311 and the first auxiliary magnetic pole piece 3321 is opposite to a magnetic pole direction of the main magnetic pole structure 32. Thus, the reduction of the magnetic flux in the main voice coil 41 can be avoided, so that the vibration reduction process can be performed while the sound production quality of the loudspeaker is ensured.

Specifically, the auxiliary magnetic pole structure 33 further includes a second auxiliary magnetic assembly, and the second auxiliary magnetic assembly includes a second auxiliary magnet 3312 and a second auxiliary magnetic pole piece 3322. An auxiliary magnetic gap is formed between the first auxiliary magnetic assembly and the second auxiliary magnetic assembly. The second auxiliary magnet 3312 is disposed on the side of the yoke 31 facing the vibration structure 2 and on a side of the first auxiliary magnet 3311 facing away from the main magnetic pole structure 32, and the second auxiliary magnetic pole piece 3322 is disposed in the auxiliary magnetic gap. A distance between the first auxiliary magnetic assembly and the second auxiliary magnetic assembly in the auxiliary magnetic gap is less than or equal to an outer diameter of the auxiliary voice coil 42, so that the auxiliary voice coil 42 is configured to approach both the upper surface of the first auxiliary magnetic assembly and the upper surface of the second auxiliary magnetic assembly during movement.

In the case where one auxiliary voice coil 42 is provided, a position of a set of opposite sides of the auxiliary voice coil 42 may correspond to the position of the auxiliary magnetic gap, and the auxiliary voice coil 42 may be disposed around the outer side of the first auxiliary magnetic assembly and located inside the second auxiliary magnetic pole assembly. In the case where at least two auxiliary voice coils 42 are provided, a position of the auxiliary voice coil 42 may correspond to the position of the auxiliary magnetic gap, and can approach the auxiliary magnetic gap during movement.

More specifically, a magnetic pole direction of the second auxiliary magnetic assembly composed of the second auxiliary magnet 3312 and the second auxiliary magnetic pole piece 3322 is opposite to the magnetic pole direction of the main magnetic pole structure 32. Thus, the reduction of the magnetic flux in the main voice coil 41 can be avoided, and the magnetic flux passing through the auxiliary voice coil 42 during movement can be increased, so that the vibration reduction process can be performed while the sound production quality of the loudspeaker is ensured.

Figure 4:
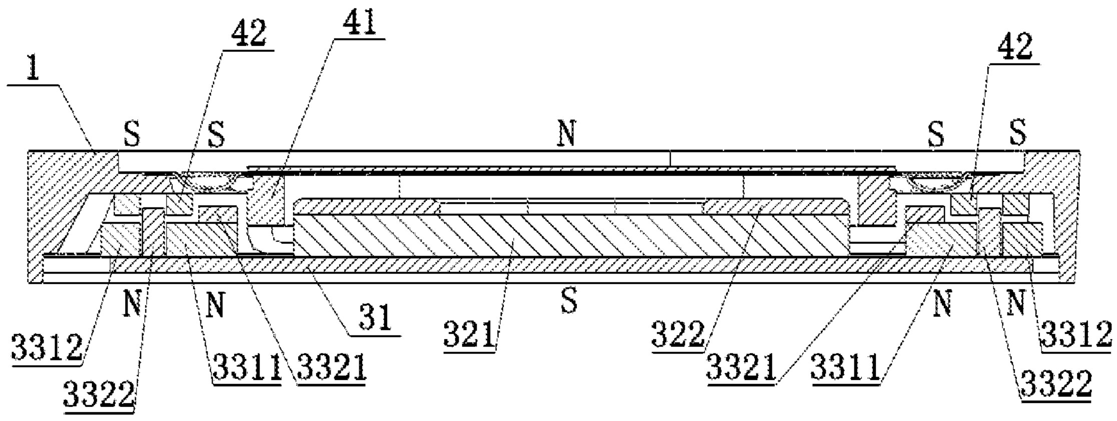
FIG. 4 is a sectional view of a loudspeaker according to the embodiment one.

In this embodiment, in terms of one magnetic pole arrangement manner shown by the designations of an N pole and an S pole in FIG. 4, an N pole of the main magnetic pole structure 32 composed of the main magnet 321 and the main magnetic pole piece 322 faces upward, an S pole of the main magnetic pole structure 32 composed of the main magnet 321 and the main magnetic pole piece 322 faces downward; an S pole of the magnetic pole structure composed of the first auxiliary magnet 3311 and the first auxiliary magnetic pole piece 3321 faces upward, an N pole of the magnetic pole structure composed of the first auxiliary magnet 3311 and the first auxiliary magnetic pole piece 3321 faces downward; and an S pole of the magnetic pole structure composed of the second auxiliary magnet 3312 and the second auxiliary magnetic pole piece 3322 faces upward, and an N pole of the magnetic pole structure composed of the second auxiliary magnet 3312 and the second auxiliary magnetic pole piece 3322 faces downward.

Figure 5:
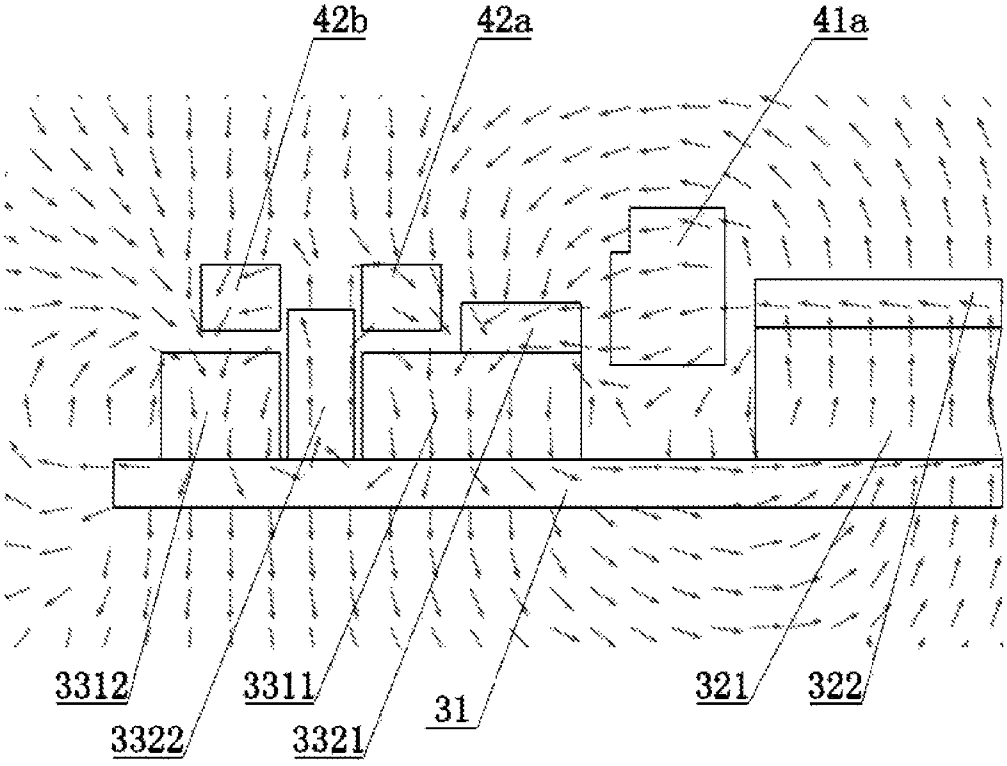
FIG. 5 is a diagram showing distribution of partial magnetic induction lines of a magnetic circuit structure according to the embodiment one.
Figure 6:
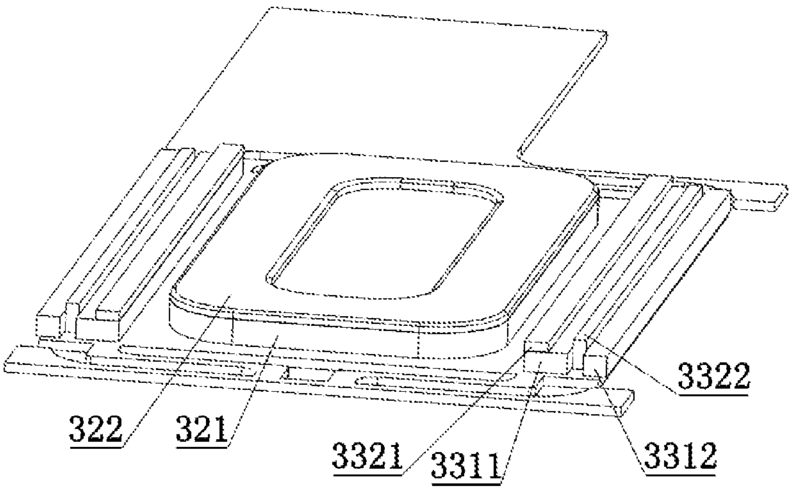
FIG. 6 is a structure view of a loudspeaker according to the embodiment one, with a shell, a vibration structure and a voice coil omitted.
Figure 7:
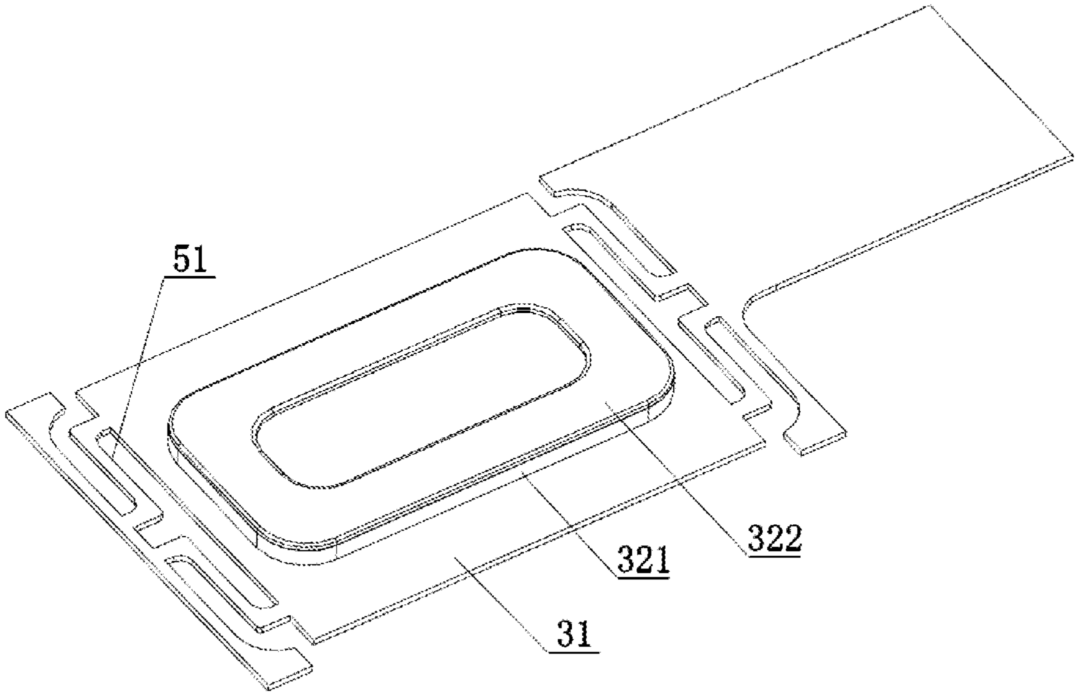
FIG. 7 is a structure view of a loudspeaker according to the embodiment one, with a shell, a vibration structure, a voice coil and an auxiliary magnetic pole structure omitted.

Specifically, an energization direction of the main voice coil 41 is opposite to an energization direction of the auxiliary voice coil 42. As shown in FIG. 5, when viewed in a cross-sectional direction, an segment on a side of the main voice coil 41 is a first main voice portion 41*a*, and the auxiliary voice coil 42 is divided into two segments parallel to each other. i.e., a first auxiliary voice portion 42*a* and a second auxiliary voice portion 42*b*, and the first main voice portion 41*a* is adjacent to the first auxiliary voice portion 42*a*. When the main voice coil 41 and the auxiliary voice coil 42 are supplied with currents in opposite directions, a direction of a current in the first main voice portion 41*a* is the same as a direction of a current in the first auxiliary voice portion 42*a*. As can be seen from the direction of the magnetic induction lines indicated in FIG. 5, a direction of magnetic induction lines passing through the first main voice portion 41*a* is opposite to a direction of magnetic induction lines passing through the first auxiliary voice portion 42*a*, so that a direction of a force applied to the first main voice portion 41*a* is opposite to a direction of a force applied to the first auxiliary voice portion 42*a* when the main voice coil 41 and the auxiliary voice coil 42 are energized for operation. When the main voice coil 41 and the auxiliary voice coil 42 are supplied with currents in opposite directions, a direction of a current in the first auxiliary voice portion 42*a* is opposite to a direction of a current in the second auxiliary voice portion 42*b*, and the direction of magnetic induction lines passing through the first auxiliary voice portion 42*a* is opposite to a direction of magnetic induction lines passing through the second auxiliary voice portion 42*b*, so that the direction of the force applied to the first auxiliary voice portion 42*a* is the same as a direction of a force applied to the second auxiliary voice portion 42*b*.

When the loudspeaker in the present disclosure is in operation, an alternating current is supplied to the main voice coil 41, and an alternating current in a direction opposite to that of the main voice coil is supplied to the auxiliary voice coil 42. In this case, a direction of an ampere force applied to the main voice coil 41 is opposite to a direction of an ampere force applied to the auxiliary voice coil 42, a magnitude of a resultant force applied to the main voice coil 41 and the auxiliary voice coil 42 is a magnitude of a force applied to the magnetic circuit structure 3, and a direction of the force applied to the magnetic circuit structure 3 is opposite to a direction of the resultant force applied to the main voice coil 41 and the auxiliary voice coil 42.

In the design of the present disclosure, it is feasible that the alternating current is applied to the auxiliary voice coil 42 in a resonance frequency band, and no alternating current is supplied to the auxiliary voice coil 42 in other frequency bands other than the resonance frequency band. In a case where the auxiliary voice coil 42 is supplied with the alternating current, the auxiliary voice coil 42 may be supplied with an alternating voltage of 1 V in a direction opposite to the energization direction of the main voice coil 41, whereby the force applied to the shell 1 of the loudspeaker in the resonant frequency band is greatly reduced. Moreover, the energized frequency band and the energized power of the two auxiliary voice coils 42 may be adjusted, and theoretically, the voltage may be continuously increased to reduce the force applied to the shell 1 of the loudspeaker, so that the full-band vibration reduction effect is achieved. It should be noted that an energizing voltage may only be within the rated power range of the voice coil 4, that is, the voltage cannot be excessively large, and the voice coil 4 is burned.

In this embodiment, the vibration structure 2 includes a center attaching plate and a vibration plate, the vibration plate has an annular structure, an outer peripheral side of the vibration plate is connected to the shell 1, an inner peripheral side of the vibration plate is connected to the center attaching plate, and the main voice coil 41 is connected to the vibration plate.

In this embodiment, the bridging structure 5 includes a cantilever 51, each of two ends of the magnetic circuit structure 3 in the third direction is provided with the cantilever 51, the magnetic circuit structure 3 is connected to the shell 1 through the cantilever 51, and is erected in the shell 1 in a suspended manner. The cantilever 51 may exert the spring-like effect. The cantilever 51 is provided so that the magnetic circuit structure 3 has a certain degree of elasticity without changing the material of the magnetic circuit structure 3, and further the auxiliary voice coil 42 can play a full role in reducing vibration.

Embodiment Two

Figure 8:
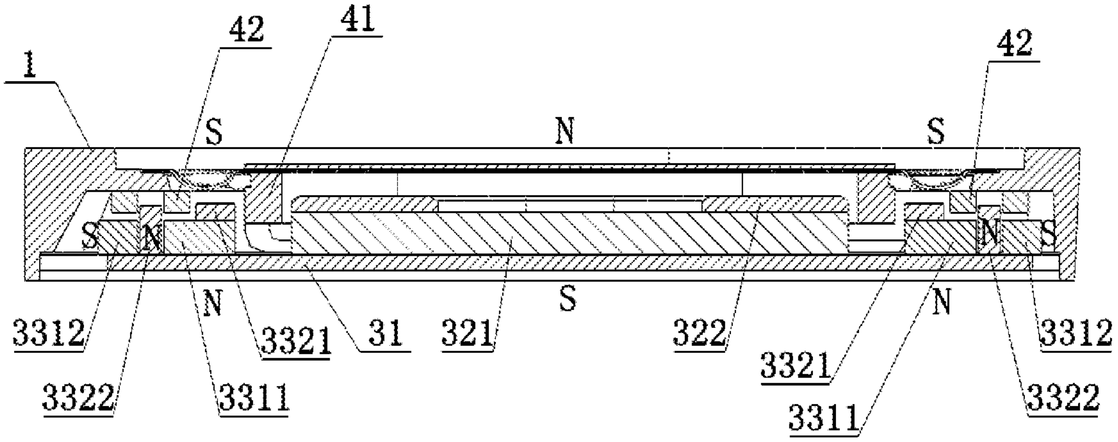
FIG. 8 is a sectional view of a loudspeaker according to an embodiment two.
Figure 9:
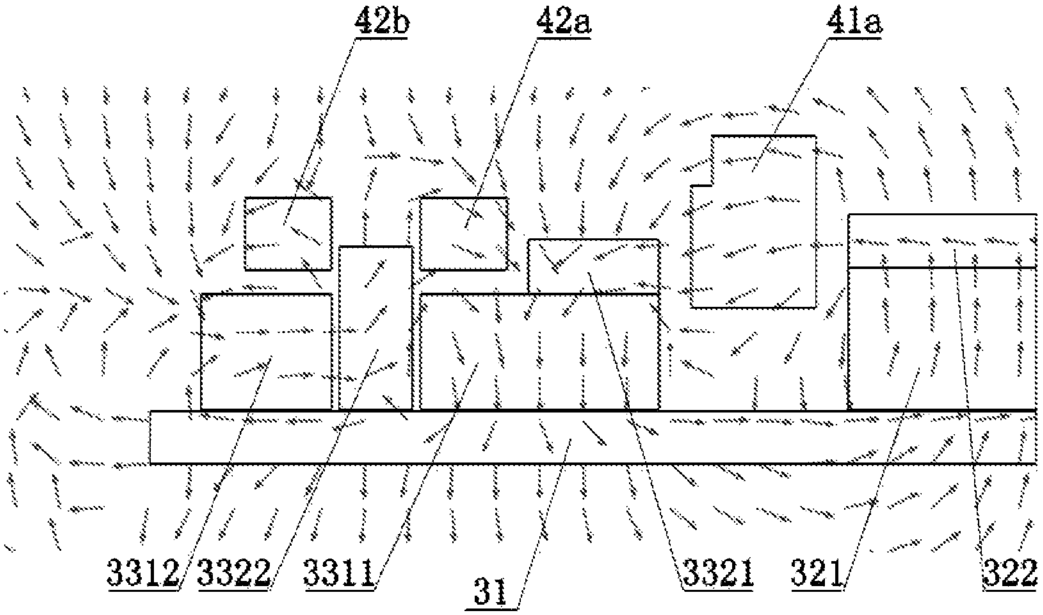
FIG. 9 is a diagram showing distribution of partial magnetic induction lines of a magnetic circuit structure according to the embodiment two.

As shown in FIGS. 8 and 9, this embodiment provides a loudspeaker, and differs from the embodiment one in that the magnetic pole direction of the second auxiliary magnetic assembly composed of the second auxiliary magnet 3312 and the second auxiliary magnetic pole piece 3322 is perpendicular to the magnetic pole direction of the main magnetic pole structure 32, so that a magnetic pole of the second auxiliary magnetic assembly with denser magnetic induction lines is closer to a path of movement of the auxiliary voice coil 42, and the auxiliary voice coil 42 is capable of passing through more magnetic induction lines during movement, thereby increasing a magnetic flux through the auxiliary voice coil 42, generating a larger reverse amperage force, and better suppressing the resonance of the magnetic circuit structure 3.

More specifically, in a magnetic pole arrangement, an end of the main magnetic pole structure 32 facing the vibration structure 2 is an N pole, an end of the main magnetic pole structure 32 facing away from the vibration structure 2 is an S pole, and an end of the magnetic pole structure composed of the second auxiliary magnet 3312 and the second auxiliary magnetic pole piece 3322 facing the main magnetic pole structure 32 is an N pole, and an end of the magnetic pole structure composed of the second auxiliary magnet 3312 and the second auxiliary magnetic pole piece 3322 facing away from the main magnetic pole structure 32 is an S pole.

More specifically, as shown by the designations of the N poles and the S poles in FIG. 8, the N pole of the main magnetic pole structure 32 composed of the main magnet 321 and the main magnetic pole piece 322 faces upward, and the S pole of the main magnetic pole structure 32 composed of the main magnet 321 and the main magnetic pole piece 322 faces downward; the S pole of the magnetic pole structure 32 composed of the first auxiliary magnet 3311 and the first auxiliary magnetic pole piece 3321 faces upward, and the N pole of the magnetic pole structure 32 composed of the first auxiliary magnet 3311 and the first auxiliary magnetic pole piece 3321 face downward; and the N pole of the magnetic pole structure composed of the second auxiliary magnet 3312 and the second auxiliary magnetic pole piece 3322 faces the main magnetic pole structure 32, and the S pole of the magnetic pole structure composed of the second auxiliary magnet 3312 and the second auxiliary magnetic pole piece 3322 faces away from the main magnetic pole structure 32.

In this embodiment, an energization direction of the main voice coil 41 is opposite to an energization direction of the auxiliary voice coil 42. As shown in FIG. 9, as viewed in cross-section, when the main voice coil 41 and the auxiliary voice coil 42 are supplied with currents in opposite directions, a direction of a current in the first main voice portion 41*a* is the same as a direction of a current in the first auxiliary voice portion 42*a*, a direction of a magnetic induction line passing through the first main voice portion 41*a* is opposite to a direction of a magnetic induction line passing through the first auxiliary voice portion 42*a*, and a direction of a force applied to the first main voice portion 41*a* is opposite to a direction of a force applied to the first auxiliary voice portion 42*a*. When the main voice coil 41 and the auxiliary voice coil 42 are supplied with currents in opposite directions, a direction of a current in the first auxiliary voice portion 42*a* is opposite to a direction of a current in the second auxiliary voice portion 42*b*. As can be seen from the direction of the magnetic induction lines indicated in FIG. 9, a direction of magnetic induction lines passing through the first auxiliary voice portion 42*a* is opposite to a direction of magnetic induction lines passing through the second auxiliary voice portion 42*b*, so that a direction of a force applied to the first auxiliary voice portion 42*a* is the same as a direction of a force applied to the second auxiliary voice portion 42*b* when the main voice coil 41 and the auxiliary voice coil 42 are energized for operation.

In the design of the present disclosure, it is feasible that the alternating current is supplied to the auxiliary voice coil 42 in the resonance frequency band, and no alternating current is supplied to the auxiliary voice coil 42 in other frequency bands other than the resonance frequency band. In the case where the auxiliary voice coil 42 is supplied with the alternating current, the auxiliary voice coil 42 may be supplied with an alternating voltage of IV in a direction opposite to the energization direction of the main voice coil 41, whereby the force applied to the shell 1 of the loudspeaker in the resonant frequency band is greatly reduced. Moreover, the energized frequency band and the energized power of the two auxiliary voice coils 42 may be adjusted, and theoretically, the voltage can be continuously increased to reduce the force applied to the shell 1 of the loudspeaker, so that the full-band vibration reduction effect is achieved. It should be noted that an energizing voltage may only be within the rated power range of the voice coil 4, that is, the voltage cannot be excessively large, and the voice coil 4 is burned.

Embodiment Three

Figure 10:
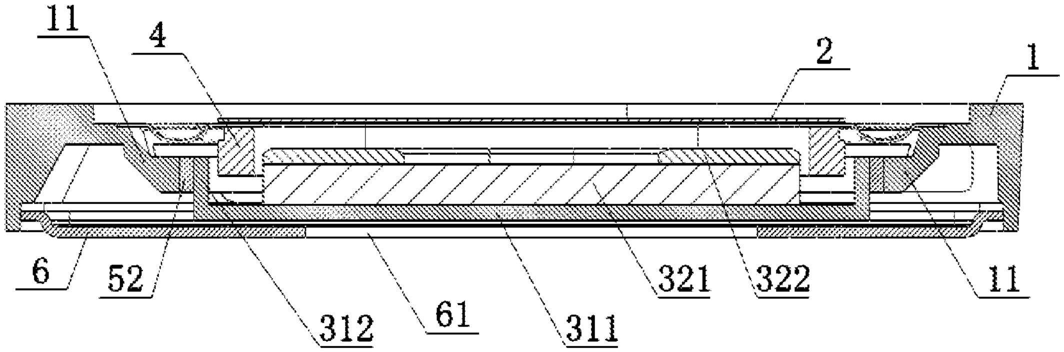
FIG. 10 is a sectional view of a loudspeaker according to an embodiment three.
Figure 11:
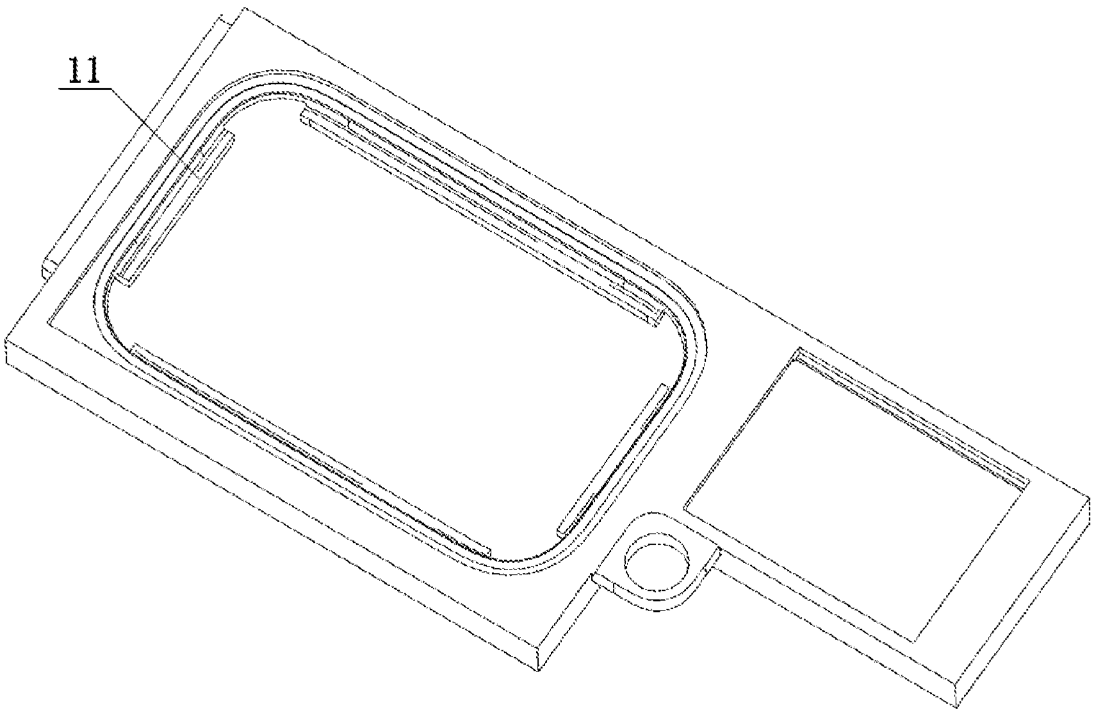
FIG. 11 is a structure view of a shell according to the embodiment three.

As shown in FIGS. 10 and 11, this embodiment provides a loudspeaker, and differs from the embodiment one in that the bridging structure 5 includes a first elastic pad 52, the first elastic pad 52 is sandwiched between the shell 1 and the yoke 31 in a direction perpendicular to the first direction, and the first elastic pad 52 provides better separation of the shell 1 from the magnetic circuit structure 3, so that the magnetic circuit structure 3 can vibrate more independently relative to the shell 1.

Specifically, the shell 1 is provided with a first support arm 11, the magnetic circuit structure 3 is disposed in the shell 1, the yoke 31 is provided with a second support arm, and the first elastic pad 52 is sandwiched between the first support arm 11 and the second support arm in a direction perpendicular to the first direction. Relative to the voice coil 4 moving in the first direction, the first elastic pad 52 is sandwiched between the first support arm 11 of the shell 1 and the second support arm of the magnetic circuit structure 3 in the direction perpendicular to the first direction, thereby reducing an offset amplitude of the magnetic circuit structure 3 in the direction perpendicular to the first direction, and ensuring the central alignment of the voice coil 4 relative to the magnetic circuit structure 3.

Specifically, the magnetic circuit structure 3 includes a yoke 31, a main magnet 321 and a main magnetic pole piece 322. The main magnet 321 is disposed on a side of the yoke 31 facing the vibration structure 2, and the main magnetic pole piece 322 is laid on a side of the main magnet 321 facing the vibration structure 2. The yoke 31, the main magnet 321 and the main magnetic pole piece 322 cooperate with each other to generate a magnetic circuit, so that the voice coil 4 can be subjected to an ampere force when energized. The mass of at least any one of the yoke 31, the main magnet 321 or the main magnetic pole piece 322 is adjusted so that a resonance frequency of the magnetic circuit structure 3 can be correspondingly adjusted, thereby producing different vibration reduction effects.

More specifically, the yoke 31 includes a bottom plate portion 311 and a support plate portion 312 connected to the bottom plate portion 311. The main magnet 321 is disposed on the bottom plate portion 311. The support plate portion 312 serves as the second support arm. The voice coil 4 is disposed around the outer side of the main magnet 321 and the main magnetic pole piece 322 and is located on the inner side of the support plate portion 312. The second support arm is formed on the yoke 31, so that interference with the voice coil 4 is avoided, the structure is simpler, and the manufacturing cost is lower.

More specifically, multiple support plate portions 312 are provided, the multiple support plate portions 312 are disposed around the main magnet 321, and adjacent support plate portions 312 are disposed at intervals, so that the structure is simple and the processing is convenient.

In this embodiment, the bottom plate portion 311 is arranged perpendicular to the first direction, the support plate portion 312 is arranged parallel to the first direction, and the bottom plate portion 311 and the support plate portion 312 are perpendicular to each other. Four support plate portions 312 are provided, the four support plate portions are located at the edges of the bottom plate portion 311 respectively, adjacent support plate portions 312 are perpendicular to each other, so that plate surfaces of the four support plate portions 312 can, on the outer side of the voice coil 4, respectively abut against the first elastic pads 52.

Specifically; the first elastic pad 52 is ring-shaped, and is sleeved around a periphery of the multiple support plate portions 312. With the above arrangement, the arrangement of the first elastic pad 52 is made more simple and convenient. In addition to the above arrangement, the first elastic pad 52 may also be a bar-shaped single body, and one first elastic pad 52 is configured on each of the support plate portions 312, and the first elastic pad 52 corresponding to the first elastic pad 52 abuts against the first support arm 11 during assembly.

In this embodiment, the first elastic pad 52 is made of silica gel and is an annular silica gel pad. In addition, the first elastic pad 52 may be made of other elastic materials such as rubber.

Specifically, multiple first support arms 11 are provided in one-to-one correspondence with multiple second support arms, one first support arm 11 and one second support arm corresponding to the one first support arm 11 abut against the first elastic pad 52 from two sides of the first elastic pad 52 respectively.

In this embodiment, four first support arms 11 are disposed within the shell 1, and correspond to the support plate portions 312. The first support arms 11 are elongated and have an elongated abutment surface.

Specifically, the loudspeaker further includes an outer cover 6, the shell 1 is provided with an accommodation cavity that penetrates in the first direction, the magnetic circuit structure 3, the voice coil 4 and the first elastic pad 52 are located in the accommodation cavity, the vibration structure 2 is connected to an opening at one end of the accommodation cavity, the outer cover 6 is connected to an opening at another end of the accommodation cavity, the vibration structure 2 and the outer cover 6 cover two ends of the accommodation cavity in a sealing manner to protect the magnetic circuit structure 3, the voice coil 4 and the first elastic pad 52 in the accommodation cavity, preventing foreign matters from entering the accommodation cavity and affecting the proper operation of the voice coil 4.

More specifically, the outer cover 6 is provided with an air vent 61 to allow for ventilation during operation of the loudspeaker so as to balance the internal and external air pressures of the accommodation cavity.

In this embodiment, the air vent 61 and the magnetic circuit structure 3 are disposed directly opposite in the first direction, a cross-sectional area of the air vent 61 in the direction perpendicular to the first direction is less than a cross-sectional area of the magnetic circuit structure 3 in the direction perpendicular to the first direction, so that a projection of the air vent 61 in the first direction is completely located on the magnetic circuit structure 3, increasing the difficulty of foreign matters in entering the accommodation cavity on the basis of ventilation.

In the loudspeaker of the present disclosure, the rigidity of the silica gel pad or the mass of the magnetic circuit structure 3 can be adjusted to change the resonance frequency of the magnetic circuit structure 3, and different resonance frequencies will also produce corresponding different vibration reduction effects.

The rigidity of the silica gel pad is related to the shape and material of the silica gel itself, and the rigidity of the silica gel pad can be reduced by increasing the width of the silica gel pad, reducing the height of the silica gel, or selecting a soft silica gel material. Conversely, the rigidity of the silica gel pad can be increased, and the shape of the silica gel pad may be determined according to the structure of the loudspeaker.

Specifically, the resonance frequency of the magnetic circuit structure 3 is A, a resonance frequency of the loudspeaker is B, and the value range of A is 77% B to 123% B. The value range of A may be 77% B to 100% B and between 100% B to 123% B in view of the cost of actual manufacturing and debugging the loudspeaker.

In the present disclosure, for different resonance frequencies of the magnetic circuit structure 3, different influences of the correlation between the resonance frequency of the magnetic circuit structure 3 and the resonance frequency of the loudspeaker on the vibration reduction effect are analyzed.

When the resonance frequency of the loudspeaker is 520 Hz and the mass of the magnetic circuit structure 3 is 3.4 g, six groups of data regarding the rigidity of the silica gel pad and the corresponding resonance frequency of the magnetic circuit structure 3 are set as below: 1) the rigidity of the silica gel pad is 12.08 N/mm, and the resonance frequency of the magnetic circuit structure 3 is 300 Hz; 2), the rigidity of the silica gel pad is 21.48 N/mm, and the resonance frequency of the magnetic circuit structure 3 is 400 Hz; 3) the rigidity of the silica gel pad is 30.92 N/mm, and the resonance frequency of the magnetic circuit structure 3 is 480 Hz; 4) the rigidity of the silica gel pad is 36.35 N/mm, and the resonance frequency of the magnetic circuit structure 3 is 520 Hz; 5) the rigidity of the silica gel pad is 48.32 N/mm, and the resonance frequency of the magnetic circuit structure 3 is 600 Hz; and 6) the rigidity of the silica gel pad is 65.77 N/mm, and the resonance frequency of the magnetic circuit structure 3 is 700 Hz.

The vibration reduction simulation experiment is performed based on the six groups of setting cases, and the experimental results showed that when the resonance frequency of the magnetic circuit structure 3 is 400 Hz to 640 Hz, a superior vibration reduction effect is achieved; when the resonance frequency of the magnetic circuit structure 3 is 480 Hz, the force applied to the shell 1 is minimized, and the optimal vibration reduction effect is achieved. At this time, the resonance frequency of the magnetic circuit structure 3 is 40 Hz lower than the resonance frequency of the loudspeaker. However, the resonance frequency of the magnetic circuit structure 3 should not be excessively far away from the resonance frequency of the loudspeaker, since too large difference between the resonance frequency of the magnetic circuit structure 3 and the resonance frequency of the loudspeaker will result in that the shell 1 of the loudspeaker is subjected to a too large force when the magnetic circuit resonates and the vibration reduction effect becomes poor. Therefore, when the difference between the resonance frequency of the magnetic circuit structure 3 and the resonance frequency of the loudspeaker is not more than 23%, the vibration reduction effect is better. Thus, the difference between the resonance frequency of the magnetic circuit structure 3 and the resonance frequency of the loudspeaker is specifically between [−23%, 0) or (0), 23%]) in consideration of the production cost and the debugging cost of the loudspeaker.

Embodiment Four

As shown in FIGS. 12 to 19, this embodiment provides a loudspeaker, and differs from the embodiment one in that: the loudspeaker according to the present disclosure includes a shell 1, and a first elastic pad 52, an inner support body 53 and a magnetic circuit structure 3 which are sequentially connected inwardly from the outside of the shell 1. The magnetic circuit structure 3 includes a yoke 31 disposed in an inner cavity of the shell 1 in a suspended manner, and the inner support body 53 includes a support rod portion 531. The support rod portion 531 forms a first connection portion 5311 on a side facing the yoke 31 (corresponding to the left side of FIG. 14), the first connection portion 5311 is connected to the yoke 31; and the support rod portion 531 forms a second connection portion 5312 on another side facing the first elastic pad 52 (corresponding to the right side of FIG. 14), and the second connection portion 5312 is connected to the first elastic pad 52.

According to the present disclosure, the inner support body 53 is disposed between the yoke 31 and the first elastic pad 52, the first connection portion 5311 in the support rod portion 531 of the inner support body 53 is connected to the yoke 31, and the second connection portion 5312 in the support rod portion 531 is connected to the first elastic pad 52, so that the yoke 31 is connected to the shell 1 through the first connection portion 5311 of the inner support body 53, the second connection portion 5312 of the inner support body 53, and the first elastic pad 52 in sequence, whereby the vibration reduction of the loudspeaker is achieved, the reliability of the installation of the yoke 31 is improved, and the service life of the loudspeaker is prolonged.

Figure 14:
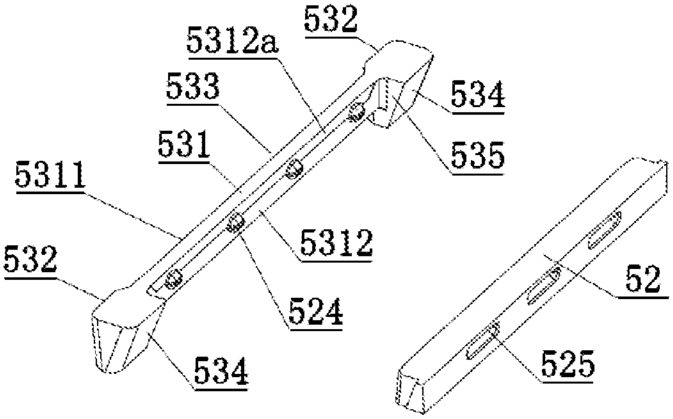
FIG. 14 is an exploded view of an inner support body and a first elastic pad cooperating with each other according to the embodiment four.
Figure 15:
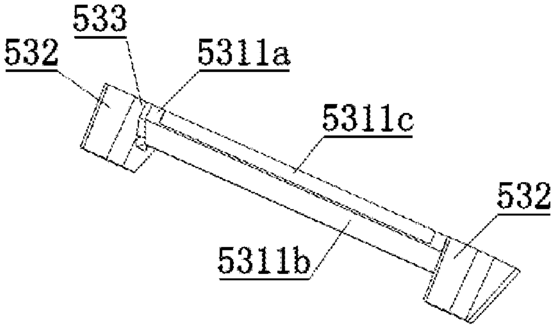
FIG. 15 is a structure view of an inner support body according to the embodiment four.

In the present disclosure, the first connection portion 5311 includes a planar portion 5311*a* connected to the yoke 31 and a ramp portion 5311*b* extending in a direction away from the planar portion 5311*a* and gradually away from the yoke 31, and the ramp portion 5311*b* is disposed to be spaced apart from the yoke 31. That is, as shown in FIGS. 14 and 15, the first connection portion 5311 is formed in a wedge-shaped structure with a wide upper portion and a narrow lower portion. The upper portion (corresponding to the upper portion of FIG. 14) of the first connection portion 5311 is the planar portion 5311*a* and is connected to the yoke 31. The inner support body 53 may, for example, have a material same as the material of the shell 1, and a hardness greater than the hardness of the first elastic pad 52, thereby improving the reliability of the connection of the inner support body 53 to the yoke 31, preventing the yoke 31 from being detached from the housing structure when the sound production device drops off, and prolonging the service life of the sound generating device. The lower portion (corresponding to the lower portion of FIG. 14) of the first connection portion 5311 is the ramp portion 5311*b*, and is disposed to be spaced apart from the yoke 31, that is, not in contact with the yoke 31, so that the contact area between the yoke 31 and the inner support body 53 can be minimized while the connection strength between the yoke 31 and the first connection portion 5311 is ensured, preventing the reacting force of the yoke 31 from being transmitted to the shell 1, and thereby further improving the vibration reduction performance of the loudspeaker.

Specifically, multiple inner support bodies 53 are disposed in a surrounding manner to define an inner support cavity, the ramp portions 5311*b* are disposed towards the inner support cavity, and when the magnetic circuit structure 3 abuts against the ramp portions 5311*b* in the first direction, the inner support bodies 53 abut against the first elastic pads 52. The ramp portions 5311*b* are provided so that the magnetic circuit structure 3 can be easily inserted into the inner support cavity. During the insertion in the first direction, the magnetic circuit structure 3 abuts against the ramp portions 5311*b* so that the multiple inner support bodies 53 are away from each other, and the inner support cavity is enlarged until the magnetic circuit structure 3 is inserted into position.

More specifically, a first limiting portion 532 and a second limiting portion 534 constitute a limiting portion, and the magnetic circuit structure 3 abuts against the limiting portion in the first direction. The limiting portion is disposed so that the magnetic circuit structure 3 can be accurately positioned in the first direction.

In the present disclosure, the yoke 31 includes a bottom plate portion 311 and a support plate portion 312 extending upwardly relative to the periphery of the bottom plate portion 311, the planar portion 5311*a* forms a first step groove 5311*c* cooperating with the support plate portion 312, and at least a portion of the support plate portion 312 is disposed in the first step groove 5311*c*. That is, the first step groove 5311*c* is disposed at a position of the planar portion 5311*a* of the first connection portion 5311. As shown in FIG. 15, the first step groove 5311*c* is provided so that the reliability of the connection between the yoke 31 and the inner support body 53 can be further improved.

Optionally, a cutting depth of the first step groove 5311*c* may be, for example, equal to a thickness of the support plate portion 312, so that the support plate portion 312 is completely disposed in the first step groove 5311*c*. With such arrangement, the connection strength between the yoke 31 and the inner support body 53 can be further improved. However, a larger depth of the first step groove 5311*c* requires the inner support body 53 to have a larger thickness, and meanwhile, also makes the volume of the loudspeaker become larger. In an embodiment, as shown in FIG. 15, the cutting depth of the first step groove 5311*c* may be, for example, less than the thickness of the support plate portion 312, that is, the support plate portion 312 is partially disposed in the first step groove 5311*c*. With such arrangement, the connection strength between the first connection portion 5311 and the yoke 31 can be improved without increasing the thickness of the inner support body 53, thereby saving the cost.

It should be noted that, in order to improve the connection strength between the yoke 31 and the inner support body 53, for example, a first convex head may be disposed on the first connection portion 5311. For example, the surface of the upper portion of the first connection portion 5311 may also be treated to form a rough surface so as to improve the static friction between the first connection portion 5311 and the yoke 31.

Figure 16:
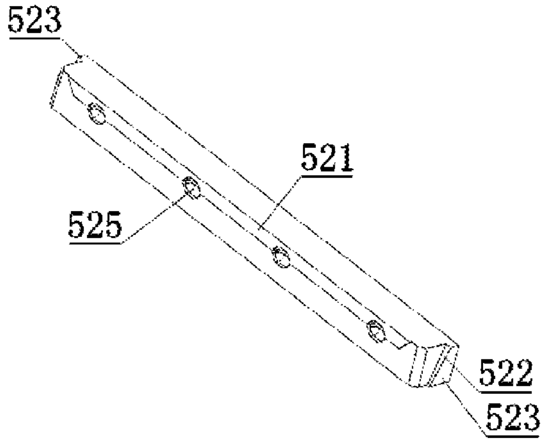
FIG. 16 is a structure view of a first elastic pad according to the embodiment four.

In the present disclosure, a boss 521 is disposed on a side of the first elastic pad 52 facing the inner support body 53, the second connection portion 5312 is formed with a second step groove 5312*a* mated with the boss 521, and the boss 521 is disposed in the second step groove 5312*a*. That is, as shown in FIGS. 14 and 16, the boss 521 of the first elastic pad 52 is mated with the second step groove 5312*a* on the second connection portion 5312 so that the connection strength between the first elastic pad 52 and the inner support body 53 can be improved. It should be noted that the side of the first elastic pad 52 facing the inner support body 53 may be provided as a groove structure, and the second connection portion 5312 may be correspondingly provided as a convex structure mated with the groove structure, so that the first elastic pad 52 and the inner support body 53 are connected to each other by concave and convex structures, thereby further improving the connection strength of the first elastic pad 52 and the inner support body 53.

Figure 17:
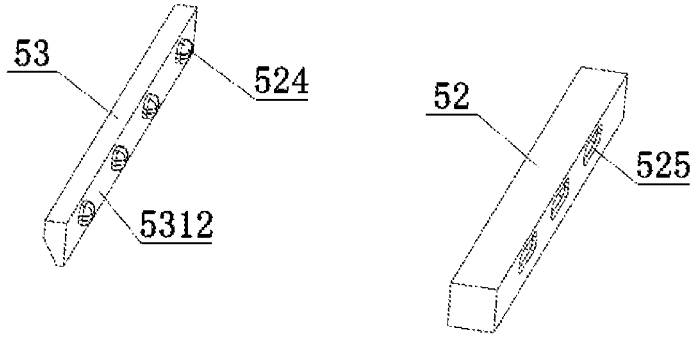
FIG. 17 is an exploded view of another inner support body and another first elastic pad cooperating with each other according to the embodiment four.
Figure 18:
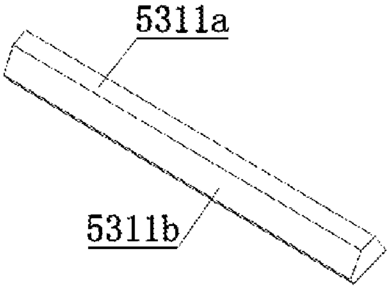
FIG. 18 is a structure view of another inner support body according to the embodiment four.
Figure 19:
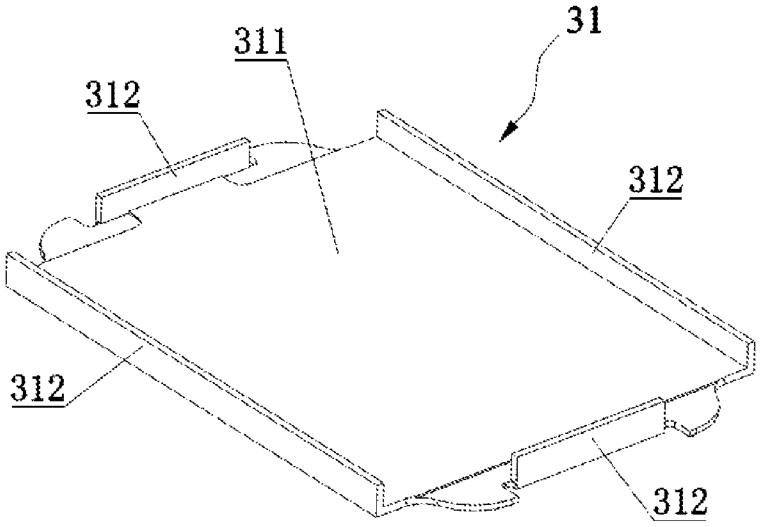
FIG. 19 is a structure view of a yoke according to the embodiment four.

Correspondingly, as shown in FIGS. 14, 16, and 17, the concave and convex structures mated with each other may be disposed on the side of the first elastic pad 52 facing the shell 1 and the inner wall of the shell 1 respectively, so that the connection strength of the first elastic pad 52 and the shell 1 is further improved.

In an implementation mode of the present disclosure, the inner support body 53 is formed in an integral frame-shaped structure (not shown) adapted to the shell 1. That is, after the inner support body 53 and the shell 1 are integrally molded by injection molding, the plastic connecting the inner support body 53 to the shell 1 is cut and then assembled and combined, which has the advantage of convenient assembly.

Figure 13:
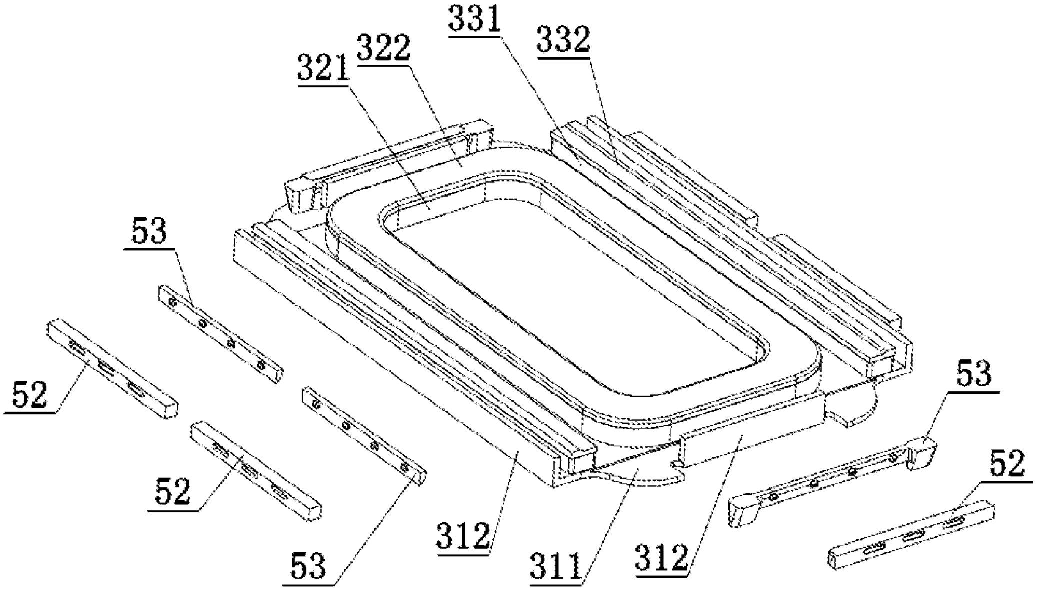
FIG. 13 is an exploded view of a partial structure of the loudspeaker according to the embodiment four.

In another implementation mode of the present disclosure, multiple inner support bodies 53 are provided, and the multiple inner support bodies 53 are disposed around a circumferential direction of the shell 1. That is, as shown in FIG. 13, after the inner support body 53 and the shell 1 are integrally molded by injection molding, the plastic connecting the inner support body 53 and the shell 1 needs to be cut, then the inner support body 53 is cut into multiple sections, excess materials are removed, and finally the inner support bodes 53 and the shell 1 are assembled. The multiple inner support bodies 53 are provided so that the utilization rate of the inner cavity space of the shell 1 can be improved, and the volume of the loudspeaker can be reduced.

Specifically; the inner support body 53 further includes two first limiting portions 532. The two first limiting portions 532 are disposed at two ends of the first connection portion 5311 respectively, and extend towards a direction of the magnetic circuit structure 3, the two first limiting portions 532 and the first connection portion 5311 are disposed in a surrounding manner to define a first receiving cavity 533, and at least a part of the yoke 31 is disposed within the first receiving cavity 533. That is, as shown in FIGS. 14 and 15, two first limiting portions 532 are formed at two ends of the first connection portion 5311 of the support rod portion 531 respectively, and the two first limiting portions 532 and the first connection portion 5311 are disposed in a surrounding manner to define the first receiving cavity 533 that can receive the yoke 31. An inner wall of the first receiving cavity 533 may be adhesively connected to an end of the yoke 31 or to the outer peripheral wall of the convex portion in the yoke 31, thereby further improving the connection strength between the yoke 31 and the inner support body 53.

More specifically, the inner support body 53 further includes two second limiting portions 534. The two second limiting portions 534 are disposed at two ends of the second connection portion 5312 respectively, and extend towards a direction facing away from the first limiting portions 532, the two second limiting portions 534 and the second connection portion 5312 are disposed in a surrounding manner to define a second receiving cavity 535, and at least a part of the first elastic pad 52 is disposed within the second receiving cavity 535. That is, as shown in FIG. 14, the two second limiting portions 534 are formed at two ends of the second connection portion 5312 of the support rod portion 531 respectively, and the two second limiting portions 534 and the second connection portion 5312 are disposed in a surrounding manner to define the second receiving cavity 535 that can receive the first elastic pad 52. An end of the first elastic pad 52 may be adhesively connected to the outer peripheral wall of the second receiving cavity 535, thereby further improving the connection strength between the first elastic pad 52 and the inner support body 53.

More specifically, a wedge-shaped surface is formed on a side of the second limiting portion 534 facing the first elastic pad 52, and the wedge-shaped surface extends in a direction towards the bottom plate portion 311 of the yoke 31 and is away from the first elastic pad 52. That is, the wedge-shaped surface is formed as a ramp structure with a wide upper portion and a narrow lower portion, which takes into account that the first elastic pad 52 is formed by an injection molding process. Specifically, the molding method of the housing of the loudspeaker of the present disclosure is as follows: the shell 1 and the inner support body 53 are integrally formed by injection molding, and then the first elastic pad 52 is injection molded in the gap between the shell 1 and the inner support body 53. Since a side of the second limiting portion 534 of the inner support body 53 facing the first elastic pad 52 is formed as a wedge-shaped surface with a wide upper portion and a narrow lower portion, it is convenient for the glue sealing during the injection molding, and moreover, the overflow of the silica gel can be prevented, and the fluidity of the silica gel is improved. It should be noted that, as shown in FIG. 13, the first elastic pad 52 may be cut into multiple sections in one-to-one correspondence with the inner support bodies 53 after injection molding, removed the excess materials and then assembled with the inner support bodies 53.

More specifically, a side of the first elastic pad 52 facing the second connection portion 5312 is formed with a notch 522 that matches with an outer wall of the second limiting portion 534, and the notch 522 fits the outer wall of the second limiting portion 534. That is, as shown in FIGS. 14 and 16, a part of the first elastic pad 52 is disposed within the second receiving cavity 535, and the other part of the first elastic pad 52 extends out of the second receiving cavity 535. The other part of the first elastic pad 52 is two extension convex hulls 523, each of which is located on a side of the first elastic pad 52 facing away from the inner support body 53, and the two extension convex hulls 523 and the part of the first elastic pad 52 disposed within the second receiving cavity 535 form two notches 522, the two notches 522 mate with the outer walls of the two second limiting portions 534 respectively, so as to further improve the connection strength between the first elastic pad 52 and the inner support body 53.

Specifically, multiple first elastic pads 52 are provided, and the multiple first elastic pads 52 are spaced apart from each other and disposed around an axial direction of the shell 1. That is, as shown in FIG. 13, the first elastic pad 52 is provided as multiple separate pieces spaced apart from each other, so that other components may be contained in the gap between two adjacent first elastic pads 52, thereby reducing the occupied area of the first elastic pad 52 in the inner cavity of the shell 1, and facilitating miniaturization of the loudspeaker. In addition, in the assembling process, the first elastic pad 52 of the split type is conveniently connected to the inner support body 53 and the shell 1, compared with the integral frame-shaped inner support body 53, so that the assembling efficiency can be improved.

Figure 12:
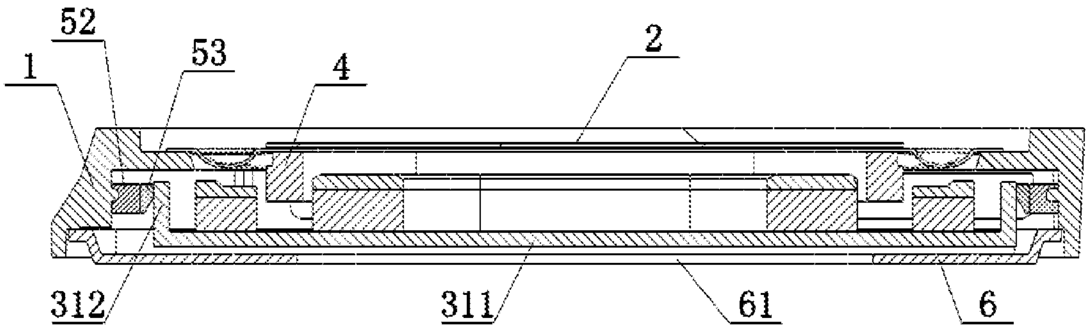
FIG. 12 is a sectional view of a loudspeaker according to an embodiment four.

In the present disclosure, the first elastic pad 52 is connected to the shell 1 by a connection structure. That is, as shown in FIGS. 12 and 13, in order to improve the reliability of the connection between the first elastic pad 52 and the shell 1, the first elastic pad 52 is disposed between the shell 1 and the inner support body 53, and optionally, the connection structure may be disposed between a side of the first elastic pad 52 facing the shell 1 and the shell 1, so that the side of the first elastic pad 52 is connected to the shell 1 through the connection structure, thereby improving the reliability of the connection between the first elastic pad 52 and the shell 1. In an embodiment, a connection structure may be disposed between the other side of the first elastic pad 52 facing the inner support body 53 and the inner support body 53 so that the other side of the first elastic pad 52 is connected to the inner support body 53 by the connection structure. In an embodiment, a connection structure may be disposed between a side of the first elastic pad 52 facing the shell 1 and the shell 1, and meanwhile, the connection structure may also be disposed between the other side of the first elastic pad 52 facing the inner support body 53 and the inner support body 53, so that the reliability of the connection of the first elastic pad 52 to the shell 1 and the inner support body 53 can be improved, thereby prolonging the life of the loudspeaker.

In an embodiment, the connection structure is formed as an adhesive layer (not shown). That is, the first elastic pad 52 may be connected to the shell 1 through an adhesive in addition to static friction, so as to further improve the connection strength of the first elastic pad 52 and the shell 1. The adhesive may be, for example, a commercially available, commonly used reagent having good adhesive strength, which is not specifically limited herein.

In another embodiment, the connection structure is formed as concave and convex structures. That is, as shown in FIGS. 14 and 17, the first elastic pad 52 may be connected to the shell 1 through concave and convex structures in addition to static friction, to further improve the connection strength of the first elastic pad 52 and the shell 1. For example, the concave and convex structures mated with each other are disposed on the first elastic pad 52 and the shell 1 respectively, and/or the concave and convex structures mated with each other is disposed on the first elastic pad 52 and the inner support body 53, respectively.

Specifically, the concave and convex structures include a projection 524 and a groove 525 mated with the projection 524, one of the projection 524 and the groove 525 is disposed on the first elastic pad 52, and the other of the projection 524 and the groove 525 is disposed on the shell 1. That is, as shown in FIGS. 14 and 17, for example, the groove 525 may be disposed on a side of the first elastic pad 52 facing the shell 1, and the projection 524 may be disposed on a side of the shell 1 facing the first elastic pad 52, so that the first elastic pad 52 is connected to the shell 1 through the projection 524 and the groove 525. For example, the groove 525 may be disposed on a side of the first elastic pad 52 facing the inner support body 53, and the projection 524 may be disposed on a side of the inner support body 53 facing the first elastic pad 52, so that the inner support body 53 is connected to the first elastic pad 52 through the projection 524 and the groove 525. It should be noted that each of two sides of the first elastic pad 52 may be provided with the groove 525 or the projection 524, or one side of the first elastic pad 52 may be provided with the groove 525, and the other side of the first elastic pad 52 is provided with the projection 524, as long as the first elastic pad 52 and the shell 1 to which the first elastic pad 52 is connected form the concave and convex structures, which is not specifically limited herein.

In this embodiment, the first elastic pad 52 is made of silica gel, and in addition, other injection-moldable and elastic materials such as rubber may be also used.

In this embodiment, the magnetic circuit structure 3 further includes a magnetic pole structure. The magnetic pole structure includes a main magnet 321, a main magnetic pole piece 322, two auxiliary magnets 331 and two auxiliary magnetic pole pieces 332. The main magnet 321 is ring-shaped and is disposed on a side of the bottom plate portion 311 facing the vibration structure 2. The main magnetic pole piece 322 is ring-shaped and is disposed on a side of the main magnet 321 facing the vibration structure 2. The two auxiliary magnets 331 are strip-shaped and are disposed on a side of the bottom plate portion 311 facing the vibration structure 2. The main magnet 321 is disposed between the two auxiliary magnets 331 in a second direction. The auxiliary magnetic pole pieces 332 are strip-shaped. One auxiliary magnetic pole piece 332 is laid on a side of each auxiliary magnet 331 facing the vibration structure 2. The voice coil 4 is in a ring-shaped structure, is disposed around peripheries of the main magnet 321 and the main magnetic pole piece 322, and is located between the two auxiliary magnets 331.

Specifically, the loudspeaker further includes an outer cover 6, the shell 1 is provided with the accommodation cavity that penetrates in the first direction, the vibration structure 2 is connected to an opening at one end of the accommodation cavity, and the outer cover 6 is connected to another end of the accommodation cavity.

More specifically, the outer cover 6 is provided with the air vent 61 so that the air is allowed to be vented during operation of the loudspeaker so as to balance the internal and external air pressures of the accommodation cavity. The air vent 61 and the magnetic circuit structure 3 are disposed directly opposite in the first direction. The cross-sectional area of the air vent 61 in the direction perpendicular to the first direction is less than the cross-sectional area of the magnetic circuit structure 3 in the direction perpendicular to the first direction, so that the projection of the air vent 61 in the first direction is completely located on the magnetic circuit structure 3, increasing the difficulty of foreign matters in entering the accommodation cavity on the basis of ventilation.

In this embodiment, the loudspeaker further includes a cushioning pad, the cushioning pad is sandwiched between the magnetic circuit structure 3 and the outer cover 6 in the first direction, and is made of silica gel or rubber material, so that the acting force exerted by the magnetic circuit structure 3 on the shell 1 during the sound production operation is further reduced.

Embodiment Five

Figure 20:
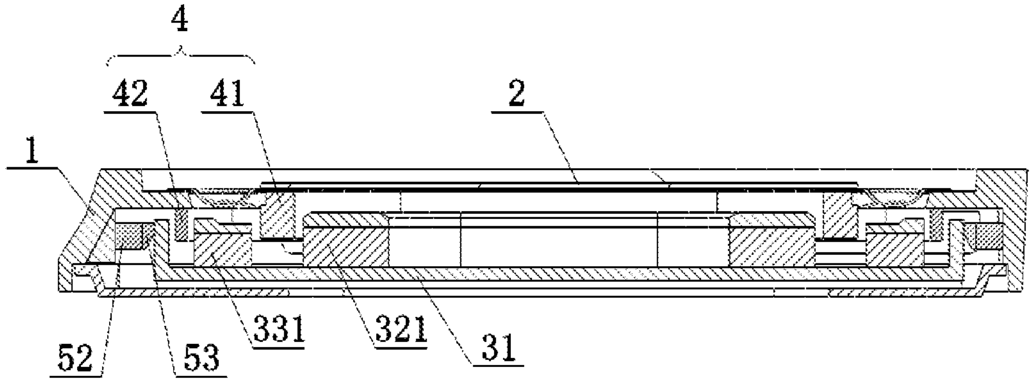
FIG. 20 is a sectional view of a loudspeaker according to an embodiment five.
Figure 21:
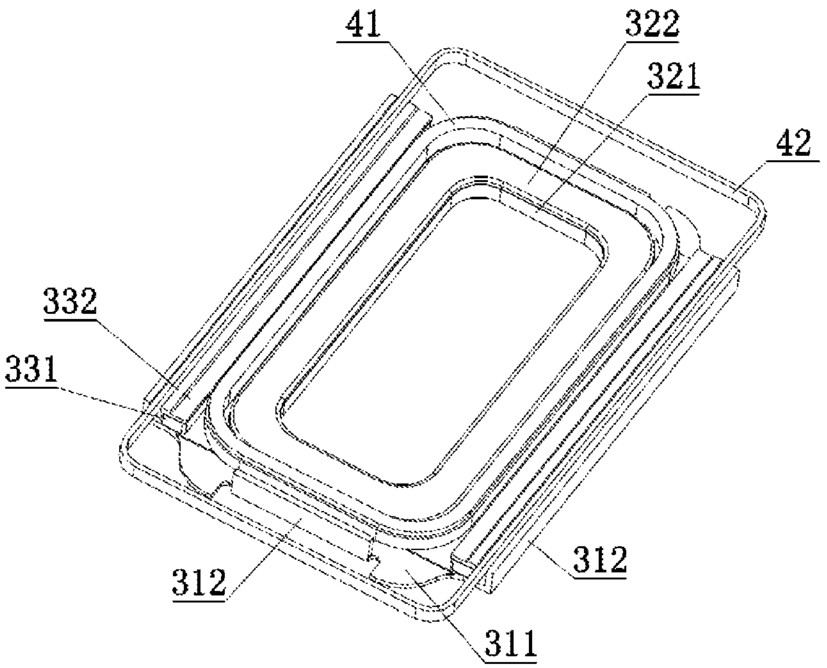
FIG. 21 is a structure view of a loudspeaker according to the embodiment five, with a shell, a vibration structure and a bridging structure omitted.
Figure 22:
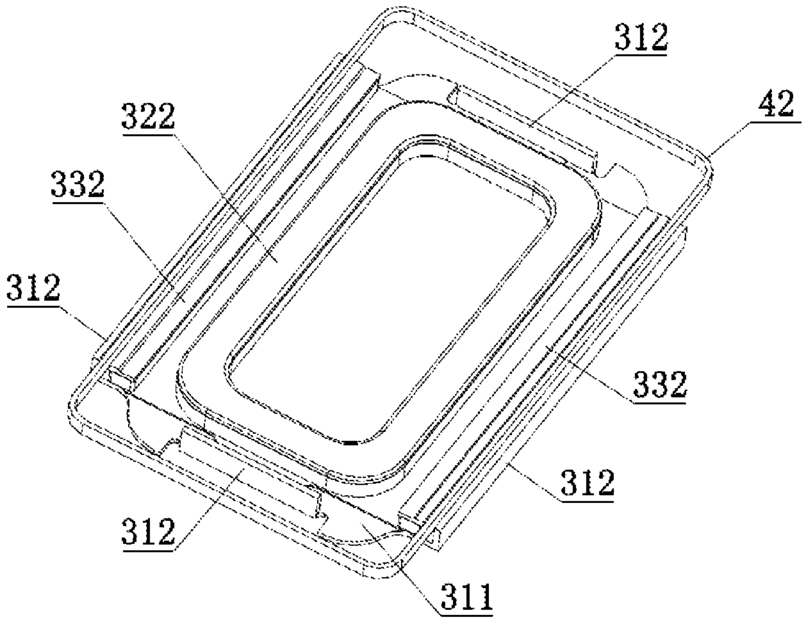
FIG. 22 is a structure view of a loudspeaker according to the embodiment five, with a shell, a vibration structure, a main voice coil and a bridging structure omitted.

As shown in FIGS. 20 to 22, this embodiment provides a loudspeaker, and differs from the embodiment four in that the voice coil 4 includes a main voice coil 41 and an auxiliary voice coil 42. The main voice coil 41 is connected to the vibration structure 2 and is movable relative to the magnetic circuit structure 3 in the first direction. The auxiliary voice coil 42 is disposed around a periphery of the main voice coil 41 and connected to the shell 1. When the main voice coil 41 and the auxiliary voice coil 42 are energized for operation, a direction of an acting force applied to the magnetic circuit structure 3 by the main voice coil 41 is opposite to a direction of an acting force applied to the magnetic circuit structure 3 by the auxiliary voice coil 42. The main voice coil 41 of the voice coil 4 can drive the vibration structure 2 to act to perform the sound production operation. The auxiliary voice coil 42 of the voice coil 4 is connected to the shell 1, and the direction of the acting force applied to the magnetic circuit structure 3 by the auxiliary voice coil 42 when energized is opposite to the direction of the acting force applied to the magnetic circuit structure by the main voice coil 41 when energized, so that the impact force of the magnetic circuit structure 3 on the shell 1 is further reduced.

Specifically, the first elastic pad 52 is sandwiched between the shell 1 and the inner support body 53 in a direction perpendicular to the first direction, and the magnetic circuit structure 3 is inserted into the inner support cavity in the first direction. The first elastic pad 52 and the inner support body 53 cooperate to limit and support the magnetic circuit structure 3 in a circumferential direction of the magnetic circuit structure 3, thereby ensuring the central alignment of the magnetic circuit structure 3 and the vibration structure 2 in the first direction, and enabling the magnetic induction coil 7 to play a more reliable role in reducing vibration in the first direction.

More specifically; the shell 1 is provided with a first support arm 11, and the inner support body 53 is connected to the first support arm 11 through the first elastic pad 52. With the above arrangement, the first elastic pad 52 can be more conveniently sandwiched and installed between the shell 1 and the inner support body 53.

In this embodiment, the first support arm 11 is disposed in the inner cavity of the shell 1, each inner support body 53 is configured in correspondence with at least one first support arm 11, and a second convex head 111 is disposed on the first support arm 11.

Specifically, the main voice coil 41 is disposed around the peripheries of the main magnet 321 and the main magnetic pole piece 322, two auxiliary magnets 331 and two auxiliary magnetic pole pieces 332 are located on the outer side of the main voice coil 41, and the auxiliary voice coil 42 is disposed around the peripheries of the two auxiliary magnets 331 and the two auxiliary magnetic pole pieces 332, and positions of one set of opposing sides in the auxiliary voice coil 42 may correspond to the positions of the two auxiliary magnets 331. With the above arrangement, under the separation of the auxiliary magnets 331 and the auxiliary magnetic pole pieces 332, the mutual influence between the main voice coil 41 and the auxiliary voice coil 42 is avoided, and the magnetic flux through the main voice coil 41 and the auxiliary voice coil 42 is ensured.

Specifically, the main magnet 321, the main magnetic pole piece 322, the two auxiliary magnets 331 and the two auxiliary magnetic pole pieces 332 are each disposed on the bottom plate portion 311 and located between the multiple support plate portions 312, and the support plate portions 312 abut against the inner support bodies 53. With the above arrangement, the installation between the yoke 31 and the shell 1 is made more reliable.

More specifically, four support plate portions 312 are provided, one support plate portion 312 is disposed at each of two ends of the bottom plate portion 311 in a second direction, and one support plate portion 312 is disposed at each of two ends of the bottom plate portion 311 in a third direction, where the first direction, the second direction and the third direction are perpendicular to each other. The yoke 31 is erected within the shell 1 through the four support plate portions 312 so that the structure is simpler on the basis of ensuring the stability.

Specifically, the support plate portions 312 at two ends of the bottom plate portion 311 in the third direction are first support plate portions, and the first support plate portions are located on the inner side of the auxiliary voice coil 42, that is, in the third direction, the main voice coil 41 is separated from the auxiliary voice coil 42 by the first support plate portion, thereby saving other isolation structures and making full use of the structure of the yoke 31.

More specifically; the support plate portions 312 at two ends of the bottom plate portion 311 in the second direction are second support plate portions, and the second support plate portions are located on the outer side of the auxiliary voice coil 42, that is, in the second direction, the main voice coil 41 is separated from the auxiliary voice coil 42 by the auxiliary magnet 331 and the auxiliary magnetic pole piece 332, and the electromagnetic induction effect of the auxiliary voice coil 42 becomes stronger by fully utilizing the second support plate portions to guide magnetic induction lines on the outer side.

In this embodiment, the bottom plate portion 311 of the yoke 31 has a rectangular sheet-like structure, the second direction is a width direction of the bottom plate portion 311, and the third direction is a length direction of the bottom plate portion 311. Two first support plate portions, corresponding first support arms 11 and corresponding first elastic pads 52 are located on the inner side of the auxiliary voice coil 42, and two second support plate portions, corresponding first support arms 11 and corresponding first elastic pads 52 are located on the outer side of the auxiliary voice coil 42. The auxiliary magnet 331 is disposed between the second support plate portion and the main magnet 321, which makes the corresponding size larger, and thus makes the electromagnetic induction effect of the auxiliary voice coil 42 stronger.

Specifically, a magnetic pole direction of the main magnet 321 is opposite to a magnetic pole direction of the auxiliary magnet 331, thereby ensuring the magnetic flux through the main voice coil 41 and the auxiliary voice coil 42.

In this embodiment, the auxiliary magnetic pole piece 332 includes a first piece body and a second piece body connected to each other, a thickness of the first piece body in the first direction is greater than a thickness of the second piece body in the first direction, and the first piece body faces away from the main magnetic pole structure 32 relative to the second piece body. With the above arrangement, the magnetic flux through the auxiliary voice coil 42 is targetedly increased.

When the first elastic pad 52 is independently provided, the vibration reduction effect of the first elastic pad 52 cannot cover the resonance frequency range of the loudspeaker. The resonance frequency of the loudspeaker is set to A, and the resonance frequency range includes A. When the loudspeaker in the present disclosure operates in the resonance frequency interval, the auxiliary voice coil 42 is energized, so that on the basis of energy conservation, the auxiliary voice coil 42 can cooperate with the first elastic pad 52 to play a role in reducing vibration targetedly.

Embodiment Six

Figure 23:
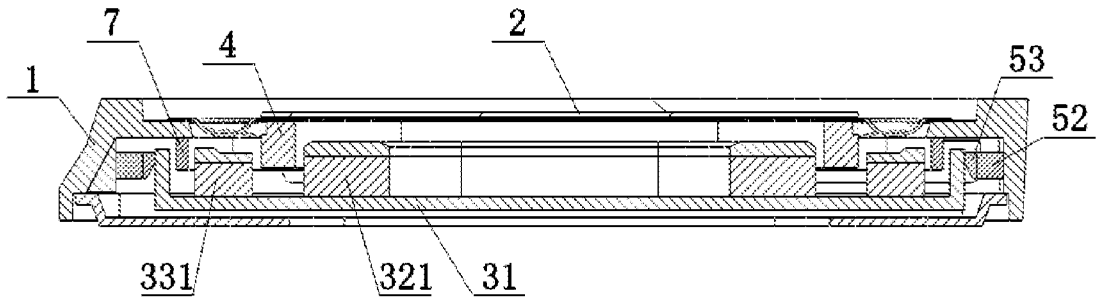
FIG. 23 is a sectional view of a loudspeaker according to an embodiment six.
Figure 24:
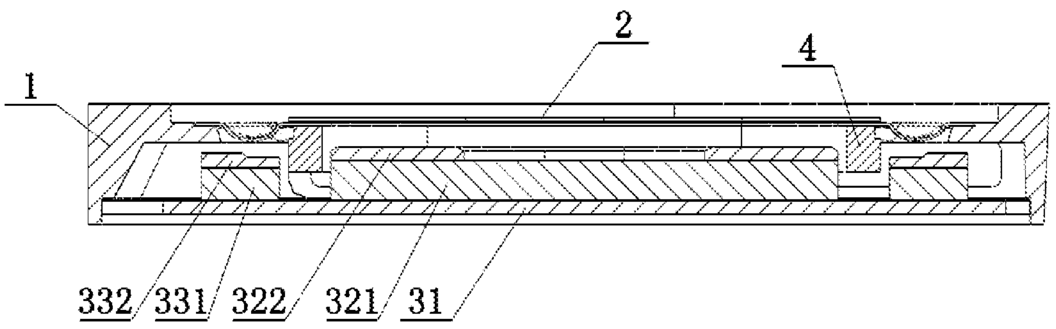
FIG. 24 is a sectional view of a loudspeaker according to an embodiment seven.
Figure 25:
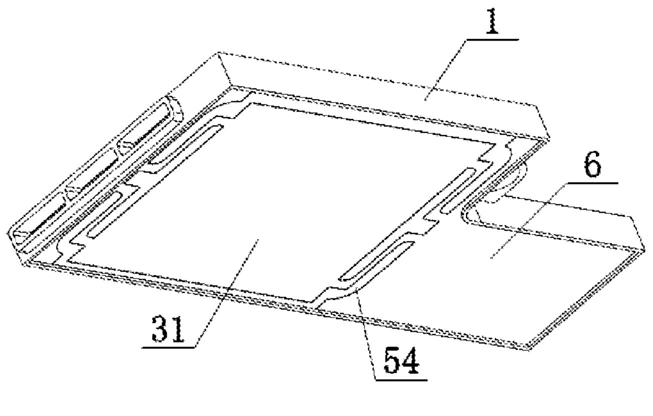
FIG. 25 is a structure view of a loudspeaker according to an embodiment seven.
Figure 26:
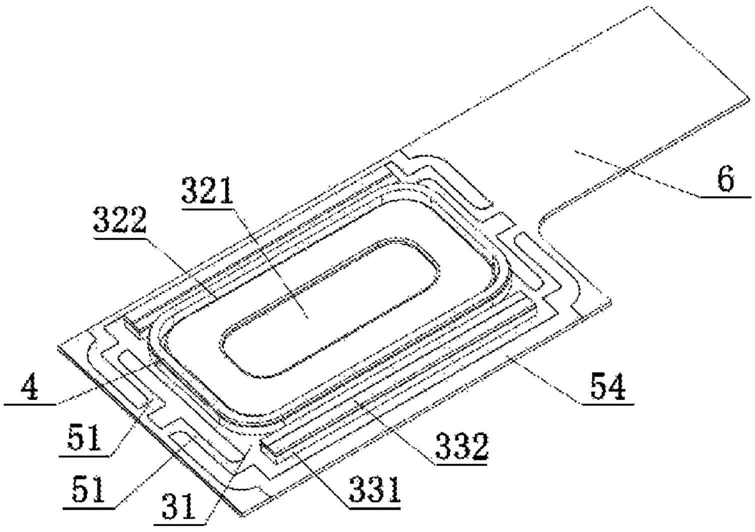
FIG. 26 is a structure view of a loudspeaker according to the embodiment seven, with a shell and a vibration structure omitted.
Figure 27:
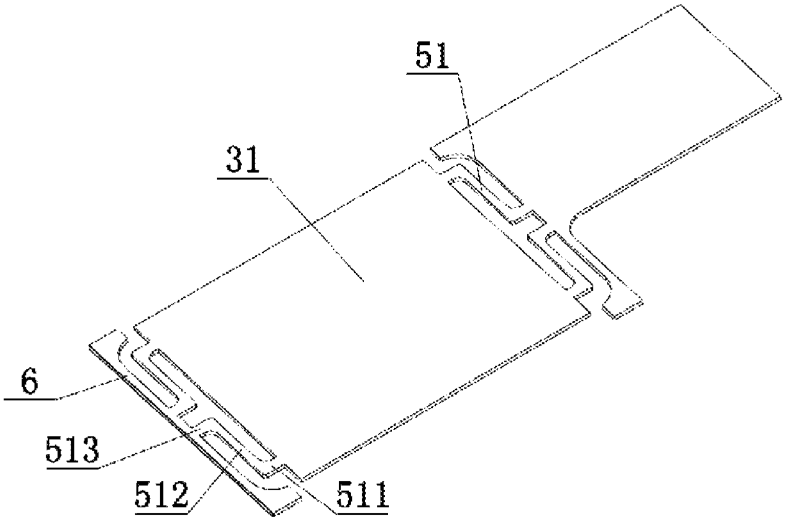
FIG. 27 is a structure view of a yoke, an outer cover and a bridging structure according to the embodiment seven.

As shown in FIG. 23, this embodiment provides a loudspeaker, and differs from the embodiment five in that the loudspeaker further includes a magnetic induction coil 7, the voice coil 4 is separately provided, is connected to the vibration structure 2, and can move relative to the magnetic circuit structure 3 in the first direction, the magnetic induction coil 7 is not energized, is disposed around the periphery of the voice coil 4, and is connected to a shell 1; when the magnetic circuit structure 3 is vibrated under the action of the voice coil 4, the auxiliary magnetic pole structure 33 gets close to the magnetic induction coil 7, and the magnetic induction coil 7 cuts magnetic induction lines in the vicinity of the auxiliary magnetic pole structure 33 to generate electromagnetic induction, thereby generating a force with a direction opposite to a movement direction of the magnetic circuit structure 3, suppressing the vibration of the magnetic circuit structure 3 and further suppressing the vibration of the shell 1. The vibration of the magnetic circuit structure 3 is suppressed by the electromagnetic induction. When the magnetic circuit structure 3 vibrates and conducts the vibration to the shell 1 through the inner support body 53, the shell 1 drives the magnetic induction coil 7 to move so that the magnetic induction coil 7 gets close to the auxiliary magnetic pole structure 33, and the magnetic induction coil 7 also cuts the magnetic induction line in the vicinity of the auxiliary magnetic pole structure 33 to generate electromagnetic induction, thereby generating a force with a direction opposite to the movement direction of the shell 1, and suppressing the vibration of the shell 1.

In this embodiment, the magnetic induction coil 7 connected to the shell 1 is provided so that when the magnetic circuit structure 3 vibrates, the magnetic induction coil 7 generates electromagnetic induction. In the frequency band where the suspension of the magnetic circuit structure has a poor vibration reduction effect and leads to resonance, vibration reduction is performed by the first elastic pad 52 and electromagnetic induction is generated by the magnetic induction coil 7, so as to jointly suppress the resonance force between the magnetic circuit structure 3 and the voice coil 4. In this manner, there is no need to provide the circuit structure inside the loudspeaker, whereby the structure of the loudspeaker is simplified, and the impact force of the magnetic circuit structure 3 on the shell 1 is reduced in a case of maintaining the power consumption of the loudspeaker unchanged. By the suspension of the magnetic circuit structure 3 in combination with the arrangement of the first elastic pad 52 and the magnetic induction coil 7, the vibration of the magnetic circuit structure 3 conducted to the shell 1 is reduced, the stability of the sound production of the loudspeaker is improved, the sound quality of the loudspeaker is improved, and thus the user experience is improved.

Specifically, the magnetic pole structure includes a main magnetic pole structure 32 and an auxiliary magnetic pole structure 33. The main magnetic pole structure 32 includes a main magnet 321 and a main magnetic pole piece 322, and is disposed on the yoke 31. The voice coil 4 is disposed around a periphery of the main magnetic pole structure 32. The auxiliary magnetic pole structure 33 includes an auxiliary magnet 331 and an auxiliary magnetic pole piece 332, and is disposed on the yoke 31 and located on the outer side of the voice coil 4. The magnetic induction coil 7 is disposed around the periphery of the auxiliary magnetic pole structure 33. When the voice coil 4 moves, the magnetic circuit structure 3 resonates so that the magnetic circuit structure 3 moves up and down. When the auxiliary magnetic pole structure 33 gets close to the magnetic induction coil 7, the magnetic induction coil 7 can generate electromagnetic induction by cutting the magnetic field of the auxiliary magnetic pole structure 33 and suppress the vibration of the magnetic circuit structure 3 by the electromagnetic induction. In a case where the auxiliary magnetic pole structure 33 is provided, the magnetic flux through the magnetic induction coil 7 can be ensured, so that a sufficient force can be generated by the electromagnetic induction to suppress the vibration of the magnetic circuit structure 3, thereby achieving a good vibration reduction effect.

More specifically, multiple auxiliary magnetic pole structures 33 are provided, and the multiple auxiliary magnetic pole structures 33 are disposed around the periphery of the main magnetic pole structure 32. With the above arrangement, the magnetic flux passing through the magnetic induction coil 7 is further ensured, so that the force applied to the magnetic induction coil 7 is more balanced.

Specifically, the support plate portions 312 at two ends of the bottom plate portion 311 in the third direction are first support plate portions, and the first support plate portions are located on the inner side of the magnetic induction coil 7, that is, in the third direction, the voice coil 4 is separated from the magnetic induction coil 7 by the first support plate portions, thereby saving other isolation structures and making full use of the structure of the yoke 31.

More specifically, the support plate portions 312 at two ends of the bottom plate portion 311 in the second direction are second support plate portions, and two auxiliary magnetic pole structures 33 are provided. One auxiliary magnetic pole structure 33 is sandwiched between each second support plate portion and the main magnetic pole structure 32. The second support plate portions are located on the outer side of the magnetic induction coil 7, that is, in the second direction, the voice coil 4 is separated from the magnetic induction coil 7 by the auxiliary magnetic pole structure 33, so that the magnetic induction effect of the magnetic induction coil 7 is enhanced by fully utilizing the second support plate portion to guide the magnetic induction line on the outer side.

Specifically; the main magnet 321 is ring-shaped and disposed on a side of the yoke 31 facing the vibration structure 2, the main magnetic pole piece 322 is ring-shaped and disposed on a side of the main magnet 321 facing the vibration structure 2, the auxiliary magnet 331 is elongated and disposed on the side of the yoke 31 facing the vibration structure 2, and the auxiliary magnetic pole piece 332 may be elongated and disposed on a side of the auxiliary magnet 331 facing the vibration structure 2.

In this embodiment, the magnetic induction coil 7 is a voice coil body, and the electromagnetic induction effect is stronger by using a conventional voice coil body structure. Alternatively, the magnetic induction coil 7 may be a ring body formed by bending a conductor material, such as a ring body formed by bending a copper sheet or a ring body formed by bending an aluminum sheet.

Embodiment Seven

As shown in FIGS. 24 to 27, this embodiment provides a loudspeaker, and differs from the embodiment one in that the main magnetic pole structure 32 includes a main magnet 321 and a main magnetic pole piece 322, and the auxiliary magnetic pole structure 33 includes an auxiliary magnet 331 and an auxiliary magnetic pole piece 332. The main magnet 321 is disposed on the yoke 31, the main magnetic pole piece 322 is disposed on a side of the main magnet 321 facing the vibration structure 2, the voice coil 4 is separately provided and disposed around the peripheries of the main magnet 321 and the main magnetic pole piece 322, the auxiliary magnet 331 is disposed on the yoke 31 and is located on the outer side of the voice coil 4, and the auxiliary magnetic pole piece 332 is disposed on a side of the auxiliary magnet 331 facing the vibration structure 2 and is located on the outer side of the voice coil 4.

In this embodiment, in order to reduce the weight of the magnetic pole structure, the main magnet 321 and/or the main magnetic pole piece 322 may be provided in an annular structure, two auxiliary magnets 331 are provided, the two auxiliary magnets 331 are symmetrically disposed on two sides of the main magnet 321, the main magnet 321 is located between the two auxiliary magnets 331 in the second direction, and one auxiliary magnetic pole structure is configured on each auxiliary magnet 331, thereby further improving the acoustic performance of the loudspeaker.

In the loudspeaker of this embodiment, the bridging structure 5 includes a cantilever 51, and two ends of the yoke 31 in the third direction are each provided with the cantilever 51, and the yoke 31 is erected at the carrying port 102 in a suspended manner and is connected to the shell 1 by the cantilevers 51. The provision of the cantilever 51 enables the magnetic circuit structure 3 to have a certain degree of elasticity on the basis of not changing the material of the magnetic circuit structure 3, thereby enabling the auxiliary voice coil 42 to play a full role in reducing vibration.

Specifically, both the yoke 31 and the cantilever 51 are located at the carrying port 102, whereby the space for the accommodation cavity 100 is saved, so that a number of magnetic poles of the magnetic pole structure within the accommodation cavity 100 can be increased, thereby improving the acoustic performance of the loudspeaker.

More specifically, at least four cantilevers 51 are provided, and at least two cantilevers 51 are provided at each of two ends of the yoke 31 in the third direction. With the above arrangement, the deflection of the magnetic circuit structure 3 during vibration is effectively avoided, and the sound quality of the loudspeaker is ensured.

In this embodiment, the cantilever 51 includes a first connection segment 511, a second connection segment 512 and a third connection segment 513 connected in sequence, the first connection segment 511 is connected to the yoke 31, and the third connection segment 513 is connected to the shell 1.

The first connection segment 511, the second connection segment 512 and the third connection segment 513 may all be straight line segments, or curved line segments, and the curved line segments may be arc-shaped or S-shaped. For example, the first connection segment 511 and the third connection segment 513 are straight line segments, and the second connection segment 512 is a curved line segment. Thus, the first connection segment 511, the second connection segment 512 and the third connection segment 513 may constitute a straight line segment, a folded line segment, or a curved line segment.

A length of the second connection segment 512, a length of the first connection segment 511, and a length of the third connection segment 513 may be equal. The length of the second connection segment 512 may also be greater than the length of the first connection segment 511 or greater than the length of the third connection segment 513, and the linear distance between two end points of the second connection segment 512 may be less than a preset length, and the preset length may be half of the length of a side of the yoke 31 connected to the cantilever.

A width of the first connection segment 511, a width of the second connection segment 512, and a width of the third connection segment 513 may be equal or unequal. Specifically, the width of the first connection segment 511 may be greater than the width of the second connection segment 512, the width of the third connection segment 513 may be greater than the width of the second connection segment 512, and the width of the second connection segment 512 may also be greater than the width of the first connection segment 511 or the width of the third connection segment 513. The first connection segment 511 may have a trapezoidal structure, and a width of an end of the first connection segment 511 connected to the yoke 31 may be greater than a width of an end of the first connection segment 511 connected to the second connection segment 512. The third connection segment 513 may also have a trapezoidal structure, and a width of an end of the third connection segment 513 connected to the yoke 31 may be greater than a width of an end of the third connection segment 513 connected to the second connection segment 512.

In a case where the length of the second connection segment 512 is greater than the length of the first connection segment 511 or greater than the length of the third connection segment 513, the length of the cantilever 51 can be increased in a limited space, whereby the elasticity of the yoke 31 can be improved, and the better vibration reduction effect is achieved.

Specifically, a spacing between the first connection segments 511 of two cantilevers 51 at one end of the yoke 31 may be equal to a spacing between the third connection segments 513 of the two cantilevers 51.

The spacing between the first connection segments 511 of the two cantilevers 51 at one end of the yoke 31 may also be greater than the spacing between the third connection segments 513 of the two cantilevers 51. When the spacing between the two first connection segments 511 is larger, the support for the yoke 31 is more stable, whereby the deflection of the yoke 31 is avoided, and when the spacing between the two third connection segments 513 at one end of the yoke 31 is relatively small, a certain degree of elasticity of the yoke 31 is ensured.

More specifically, the first connection segment 511 is connected to the second connection segment 512 according to a first preset angle, and the second connection segment 512 is connected to the third connection segment 513 according to a second preset angle. The first preset angle and the second preset angle may be the same or different. As a specific embodiment, when the first connection segment 511, the second connection segment 512 and the third connection segment 513 constitute a fold line segment, the first preset angle may be 90°, and the second preset angle may be 90°, so that the length of the cantilever 51 is increased as much as possible without intersection of cantilevers 51 at the same, thereby improving the elasticity of the yoke 31 and further improving the vibration reduction effect.

In this embodiment, the yoke 31 has a first symmetry plane and a second symmetry plane. The first symmetry plane is parallel to the first direction and the third direction, and the second symmetry plane is parallel to the first direction and the second direction. Two cantilevers 51 at one end of the yoke 31 are symmetrically disposed relative to the first symmetry plane, and cantilevers 51 at two ends of the yoke 31 are symmetrically disposed relative to the second symmetry plane, so that the force on the yoke 31 is more balanced.

Specifically, the bridging structure 5 further includes a second elastic pad 54, the second elastic pad 54 is disposed at the carrying port 102, is connected to the shell 1 and the yoke 31, and seals the carrying port 102. The elastic material is filled in the gap between every two cantilevers 51, in the gap between the cantilevers 51 and the yoke 31, and in the gap between the cantilevers 51 and the shell 1 to form the second elastic pad 54. The thickness of the elastic material may be consistent with the side thickness of the cantilever 51, or may be less than the side thickness of the cantilever 51. For example, the silicone gel is filled the gap between every two cantilevers 51, the gap between the cantilevers 51 and the yoke 31, and the gap between the cantilevers 51 and the shell 1, and the silicone gel forms the second resilient pad 54.

In the case of filling the gap, an elastic material with a first thickness may be filled in the gap between the every two cantilevers 51, the gap between the cantilevers 51 and the yoke 31, and the gap between the cantilevers 51 and the shell 1. In an optional embodiment, the first thickness may be the same as a side surface thickness of the cantilevers 51, or any thickness value less than the side surface thickness of the cantilevers 51, such as, one half of the side thickness of the cantilevers 51.

An elastic material with different thicknesses may be filled in the gap between the every two cantilevers 51, the gap between the cantilevers 51 and the yoke 31, and the gap between the cantilevers 51 and the shell 1. For example, an elastic material with a second thickness may be filled in the gap between the every two cantilevers 51, and the gap between the cantilevers 51 and the yoke 31, and an elastic material with a third thickness may be filled in the gap between the cantilevers 51 and the shell 1, or an elastic material with a second thickness may be filled in the gap between the cantilevers 51 and the yoke 31 and the gap between the cantilevers 51 and the shell 1, and an elastic material with a third thickness may be filled in the gap between the every two cantilevers 51. The second thickness is different from the third thickness. The second thickness may be greater than the third thickness, and the second thickness may also be less than the third thickness.

The second elastic pad 54 is provided so that the damping of the magnetic circuit structure 3 is increased, and the force on the shell 1 is further reduced when the magnetic circuit structure 3 vibrates. The second elastic pad 54 functions as a spring. Therefore, the rigidity of the yoke 31 can be reduced accordingly. On this basis, the second elastic pad 54 is configured to, in cooperation with the yoke 31, seal the carrying port 102 without providing an additional sealing structure on the outer side of the yoke 31, thereby avoiding foreign objects from entering the accommodation cavity 100 and saving the height space occupied by the loudspeaker.

More specifically, the loudspeaker further includes an outer cover 6, the outer cover 6 is connected to the shell 1 and disposed at the carrying port 102, and the yoke 31 is connected to the shell 1 through the outer cover 6. The yoke 31 is connected to the outer cover 6 so that the yoke 31 is connected to the shell 1 through the outer cover 6, the yoke 31 and the outer cover 6 cooperate with each other to cover the carrying port 102, so that the size of the yoke 31 can be flexibly set according to actual vibration reduction requirements, avoiding the problem of providing the cantilever 51 in excess of a desired length when the cantilever 51 is connected to the shell 1 due to the small size of the yoke 31.

More specifically, the yoke 31, the cantilever 51 and the outer cover 6 are integrally formed by hollowing and processing a plate sheet structure, thereby achieving more reliable connection, more accurate size, and lower cost. Alternatively, the outer cover 6 and the yoke 31 may be two sheet-like structures, and the outer cover 6 and the yoke 31 are connected to each other by welding or adhesive bonding.

In this embodiment, the second elastic pad 54 is made of silica gel, is formed at the hollow part of the plate sheet structure by the injection molding, and is connected to the shell 1, thereby achieving simple molding and reliable sealing. Alternatively, the second elastic pad 54 may be made of rubber.

It should be understood that the various embodiments described above may be selectively combined as desired.

Apparently, the above-described embodiments of the present disclosure are merely examples for clearly illustrating the present disclosure and are not intended to limit the implementation modes of the present disclosure. Other variations or modifications in different forms may be made in light of the above description for those of ordinary skill in the art. This need not be, nor should it be exhaustive of all implementation modes.

What is claimed is:

1. A loudspeaker, comprising:
- a shell;
- a vibration structure disposed on the shell;
- a magnetic circuit structure comprising a yoke and a magnetic pole structure disposed on the yoke;
- a voice coil connected to the vibration structure and movable relative to the magnetic circuit structure; and
- a bridging structure through which the yoke is connected to the shell, wherein when the loudspeaker is in sound generating operation, the magnetic circuit structure is configured to vibrate independently relative to the shell under separation of the bridging structure.

2. The loudspeaker of claim 1, wherein the voice coil comprises a main voice coil and at least one auxiliary voice coil, the main voice coil is connected to the vibration structure, and the at least one auxiliary voice coil is connected to the shell, wherein when the main voice coil and the at least one auxiliary voice coil are energized for operation, a direction of an acting force applied to the magnetic circuit structure by the main voice coil is opposite to a direction of an acting force applied to the magnetic circuit structure by the at least one auxiliary voice coil.

3. The loudspeaker of claim 2, wherein the magnetic pole structure comprises:
- a main magnetic pole structure disposed on the yoke, wherein the main voice coil is disposed around a periphery of the main magnetic pole structure; and
- auxiliary magnetic pole structures disposed on the yoke and located on an outer side of the main voice coil, wherein each of the at least one auxiliary voice coil is configured with a respective one of the auxiliary magnetic pole structures.

4. The loudspeaker of claim 3, wherein two auxiliary voice coils are provided, the two auxiliary voice coils are disposed at an interval, and the main voice coil is located between the two auxiliary voice coils.

5. The loudspeaker of claim 3, wherein the auxiliary magnetic pole structure comprises:
- a first auxiliary magnetic assembly disposed on the yoke and located at the periphery of the main magnetic pole structure, wherein the first auxiliary magnetic assembly and the main magnetic pole structure are configured to be magnetized in a vibration direction of the vibration structure, and a magnetic pole direction of the first auxiliary magnetic assembly is opposite to a magnetic pole direction of the main magnetic pole structure; and
- a second auxiliary magnetic assembly disposed on the yoke and located on a side of the first auxiliary magnetic assembly facing away from the main magnetic pole structure, wherein a magnetic pole direction of the second auxiliary magnetic assembly is parallel to the magnetic pole direction of the main magnetic pole structure.

6. The loudspeaker of claim 5, wherein a main magnetic gap is formed between the first auxiliary magnetic assembly and the main magnetic pole structure, and the main voice coil is disposed within the main magnetic gap in a suspended manner and passes through the main magnetic gap when moving; and
- an auxiliary magnetic gap is formed between the first auxiliary magnetic assembly and the second auxiliary magnetic assembly.

7. The loudspeaker of claim 3, wherein the auxiliary magnetic pole structure comprises:
- a first auxiliary magnetic assembly disposed on the yoke and located at the periphery of the main magnetic pole structure, wherein the first auxiliary magnetic assembly and the main magnetic pole structure are configured to be magnetized in a vibration direction of the vibration structure, and a magnetic pole direction of the first auxiliary magnetic assembly is opposite to a magnetic pole direction of the main magnetic pole structure; and
- a second auxiliary magnetic assembly disposed on the yoke and located on a side of the first auxiliary magnetic assembly facing away from the main magnetic pole structure, wherein a magnetic pole direction of the second auxiliary magnetic assembly is perpendicular to the magnetic pole direction of the main magnetic pole structure.

8. The loudspeaker of claim 7, wherein a main magnetic gap is formed between the first auxiliary magnetic assembly and the main magnetic pole structure, and the main voice coil is disposed within the main magnetic gap in a suspended manner and passes through the main magnetic gap when moving; and
- an auxiliary magnetic gap is formed between the first auxiliary magnetic assembly and the second auxiliary magnetic assembly.

9. The loudspeaker of claim 3, wherein the main magnetic pole structure comprises:

a main magnet and a main magnetic pole piece, wherein the main magnet is disposed on a side of the yoke facing the vibration structure, the main magnetic pole piece is disposed on the main magnet, and the main voice coil is disposed around peripheries of the main magnet and the main magnetic pole piece.

10. The loudspeaker of claim 1, wherein the bridging structure comprises cantilevers, two ends of the yoke are provided with the cantilevers respectively, and the yoke is erected in the shell in a suspended manner and is connected to the shell through the cantilevers.

11. The loudspeaker of claim 10, further comprising an outer cover connected to the shell, wherein the cantilevers are connected to the shell through the outer cover, and the yoke, the cantilevers and the outer cover are integrally formed by hollowing and processing one plate sheet structure.

12. The loudspeaker of claim 11, wherein the bridging structure comprises a first elastic pad sandwiched between the shell and the yoke.

13. The loudspeaker of claim 10, wherein at least four cantilevers are provided, and at least two cantilevers are provided at each of two ends of the yoke in a third direction.

14. The loudspeaker of claim 10, wherein each of the cantilevers includes a first connection segment, a second connection segment and a third connection segment connected in sequence, the first connection segment is connected to the yoke, and the third connection segment is connected to the shell.

15. The loudspeaker of claim 14, wherein a spacing between first connection segments of two cantilevers at one end of the yoke is equal to a spacing between third connection segments of the two cantilevers.

16. The loudspeaker of claim 14, wherein a spacing between first connection segments of two cantilevers at one end of the yoke is greater than a spacing between third connection segments of the two cantilevers.

17. The loudspeaker of claim 10, wherein the bridging structure further comprises a second elastic pad; the second elastic pad is disposed at a carrying port of the shell, is connected to the shell and the yoke, and seals the carrying port; and an elastic material is filled in a gap between every two cantilevers, in a gap between the cantilevers and the yoke, and in a gap between the cantilevers and the shell to form the second elastic pad.

18. The loudspeaker of claim 10, wherein the bridging structure comprises a first elastic pad sandwiched between the shell and the yoke.

19. The loudspeaker of claim 1, wherein the bridging structure comprises a first elastic pad sandwiched between the shell and the yoke.

20. The loudspeaker of claim 19, wherein the bridging structure further comprises a plurality of inner support bodies, the plurality of inner support bodies are connected to the shell through the first elastic pad, and the yoke is sandwiched between the plurality of inner support bodies.

* * * * *